United States Patent
Ibrahimkutty et al.

(10) Patent No.: US 12,413,627 B2
(45) Date of Patent: Sep. 9, 2025

(54) POLICY ENGINE FOR GOVERNING CLOUD ENVIRONMENTS

(71) Applicant: Oracle International Corporation, Redwood Shores, CA (US)

(72) Inventors: Asif Ibrahimkutty, Trivandrum (IN); Biju Narayanan, Trivandrum (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/735,777

(22) Filed: Jun. 6, 2024

(65) Prior Publication Data

US 2024/0333774 A1    Oct. 3, 2024

Related U.S. Application Data

(63) Continuation of application No. 17/391,488, filed on Aug. 2, 2021, now Pat. No. 12,034,773.

(30) Foreign Application Priority Data

Mar. 23, 2021 (IN) .............................. 202141012524

(51) Int. Cl.
*H04L 9/40* (2022.01)
*G06F 9/455* (2018.01)
(Continued)

(52) U.S. Cl.
CPC .......... *H04L 63/20* (2013.01); *G06F 9/45558* (2013.01); *G06F 9/5055* (2013.01);
(Continued)

(58) Field of Classification Search
CPC ... H04L 63/205; H04L 63/20; H04L 41/0893; H04L 41/22; H04L 41/40; H04L 41/5096;
(Continued)

(56) References Cited

U.S. PATENT DOCUMENTS 8,532,978 B1    9/2013    Turner
11,593,363 B1 *  2/2023    Sandall .................. G06F 16/951
(Continued)

FOREIGN PATENT DOCUMENTS

CN    102739770 B    6/2015
CN    104092565 B    3/2017
(Continued)

OTHER PUBLICATIONS

Makwe et al., "A Survey of Scheduling Policies in Cloud Computing Environment", Published Apr. 2016, International Journal of Emerging Trends & Technology in Computer Science, 34(4), pp. 169-173.

(Continued)

*Primary Examiner* — Shaqueal D Wade-Wright
(74) *Attorney, Agent, or Firm* — Potomac Law Group, PLLC

(57) ABSTRACT

Embodiments govern cloud environments using a policy engine. A plurality of policy definitions for governing a plurality of managed environments can be received at a policy engine, each policy definition including one or more conditions and one or more actions, where the managed environments implement cloud based virtual machines that host cloud based applications. Events that relate to one or more of the managed environments can be received at the policy engine. Conditions for the policy definitions can be evaluated by the policy engine, where conditions for a first policy definition are triggered based on one or more of the received events. Based on the evaluating, one or more actions of the first policy definition can be performed, the one or more actions changing a first managed environment that is governed by the first policy definition.

20 Claims, 16 Drawing Sheets

(51) Int. Cl.
  *G06F 9/50* (2006.01)
  *H04L 41/0894* (2022.01)
  *H04L 41/50* (2022.01)

(52) U.S. Cl.
  CPC ........ *G06F 9/5072* (2013.01); *H04L 41/0894* (2022.05); *H04L 63/205* (2013.01); *G06F 2009/45562* (2013.01); *G06F 2009/45587* (2013.01); *G06F 2009/45595* (2013.01); *H04L 41/5096* (2013.01); *H04L 63/102* (2013.01)

(58) Field of Classification Search
  CPC ............. H04L 41/0894; G06F 9/45558; G06F 9/5055; G06F 9/5072; G06F 2009/45562; G06F 2009/45587; G06F 2009/45595; G06F 9/5083; G06F 2209/5019; G06F 9/542
  See application file for complete search history.

(56) References Cited

U.S. PATENT DOCUMENTS

| | | |
|---|---|---|
| 2005/0091185 A1 | 4/2005 | Koutyrine et al. |
| 2007/0260976 A1 | 11/2007 | Slein et al. |
| 2009/0288135 A1 | 11/2009 | Chang et al. |
| 2011/0265168 A1 | 10/2011 | Lucovsky et al. |
| 2013/0263209 A1 | 10/2013 | Panuganty |
| 2013/0290239 A1* | 10/2013 | Vaquero ................. G06N 5/025 706/47 |
| 2015/0212893 A1* | 7/2015 | Pawar ................. G06F 11/1451 707/649 |
| 2015/0328550 A1 | 11/2015 | Herzig et al. |
| 2016/0057027 A1 | 2/2016 | Hinrichs et al. |
| 2016/0277249 A1* | 9/2016 | Singh ................. H04L 67/1097 |
| 2017/0099188 A1 | 4/2017 | Chang et al. |
| 2019/0014152 A1* | 1/2019 | Verma ................. H04W 12/08 |
| 2021/0014119 A1 | 1/2021 | Seshadri et al. |
| 2021/0374767 A1 | 12/2021 | Kurian et al. |
| 2023/0342179 A1* | 10/2023 | Suttle ................. H04L 41/0894 |

FOREIGN PATENT DOCUMENTS

| | | |
|---|---|---|
| WO | 2013107141 A1 | 7/2013 |
| WO | 2016025321 A1 | 2/2016 |

OTHER PUBLICATIONS

Moghaddam et al., "Policy Engine as a Service (PEaaS): An Approach to a Reliable Policy Management Framework in Cloud Computing Environments", conference Aug. 22-24, 2016, https://ieeexplore.ieee.org/document/7575855.

Unknown, "Configure a cloud policy rule", ServiceNow, https://cutt.ly/FkYr7xM, last downloaded Feb. 10, 2021.

Unknown, "Creating and managing organization policies", https://cutt.ly/5kYrXQD, last downloaded Feb. 10, 2021.

Unknown, "IBM Netcool Operations Insight", https://cutt.ly/skYtrsR, last downloaded Feb. 10, 2021.

Unknown, "Managing alerting policies", https://cutt.ly/YkYr10S, last downloaded Feb. 10, 2021.

Unknown, "Policies for Cloud Provisioning", https://cutt.ly/2kYr3kf, last downloaded Feb. 10, 2021.

Unknown, Flexera CMP APIs, "Policy Automation", https://docs.rightscale.com/policies/, last downloaded Feb. 10, 2021.

Unknown, IBM Tivoli Netcool/Impact, version 7.1.0, "Running policies using schedules", https://cutt.ly/dkYtuzq, last downloaded Feb. 10, 2021.

* cited by examiner

POLICY ENGINE FOR GOVERNING CLOUD ENVIRONMENTS

CROSS REFERENCE TO RELATED APPLICATION

This application is a continuation of U.S. patent application Ser. No. 17/391,488, entitled POLICY ENGINE FOR GOVERNING CLOUD ENVIRONMENTS, filed Aug. 2, 2021, which claims priority to IN Patent Application No. 202141012524, filed Mar. 23, 2021, the disclosure of which is hereby incorporated by reference.

FIELD

The embodiments of the present disclosure generally relate to governing cloud environments using a policy engine.

BACKGROUND

The rapid rise of cloud computing has generated substantial value, but also presented new challenges. For example, cloud computing environments have increased the accessibility and flexibility of computing resources, however these environments themselves require management. Improperly managed environments can operate inefficiently, expose sensitive systems to cybersecurity risks, and otherwise ineffectively distribute computing resources. Accordingly, techniques for cloud environment governance can achieve improved system performance.

SUMMARY

The embodiments of the present disclosure are generally directed to systems and methods for governing cloud environments using a policy engine. A plurality of policy definitions for governing a plurality of managed environments can be received at a policy engine, each policy definition including one or more conditions and one or more actions, where the managed environments implement cloud based virtual machines that host cloud based applications. Events that relate to one or more of the managed environments can be received at the policy engine. Conditions for the policy definitions can be evaluated by the policy engine, where conditions for a first policy definition are triggered based on one or more of the received events. Based on the evaluating, one or more actions of the first policy definition can be performed, the one or more actions changing a first managed environment that is governed by the first policy definition.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Embodiments govern managed computing environments using a policy engine. An environment can include computing environment (e.g., cloud computing environment) with a set of resources for administration (e.g., cloud applications, cloud computing resources, virtual machines, and the like). A policy can be a simplified technique for administering and automating different use cases (e.g., environments and other factors) using rules. For example, an environment can be managed using a policy by defining certain rules that, when satisfied, trigger certain actions.

Embodiments of software, such as PeopleSoft, permit cloud administrators to manage different environments. For example, a common use case where policies can play a role is administering life cycle activities of environments. In some embodiments, policies can be scheduled or can be executed in real-time based on events. For example, scheduling allows policies to be executed at a set date and time or in a recurring fashion, such as: "Perform backup of all environments every Friday at 10 PM". In some embodiments, policies can also be triggered through internal or external events. An example policy that can make use of internal events is: "Perform update on all running environments, when a new Infra DPK is downloaded". In some embodiments, policies can also be connected with external events, such as "Oracle Cloud Infrastructure" events or events generated from artificial intelligence ("AI")/machine learning ("ML") engines.

In some embodiments, a policy engine can be configured to govern a plurality of computing environments. For example, various policies can be defined that each include conditions (e.g., for triggering the policy) and at least one action. In some embodiments, the policy engine can evaluate the conditions for the defined policies over time. For example, the conditions can be evaluated until one or more policies are triggered (e.g., when the conditions for the policies are met). In some embodiments, an external event can trigger a policy at the policy engine. Once triggered, the policy engine can execute one or more actions to manage an environment based on the triggered policy or policies.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
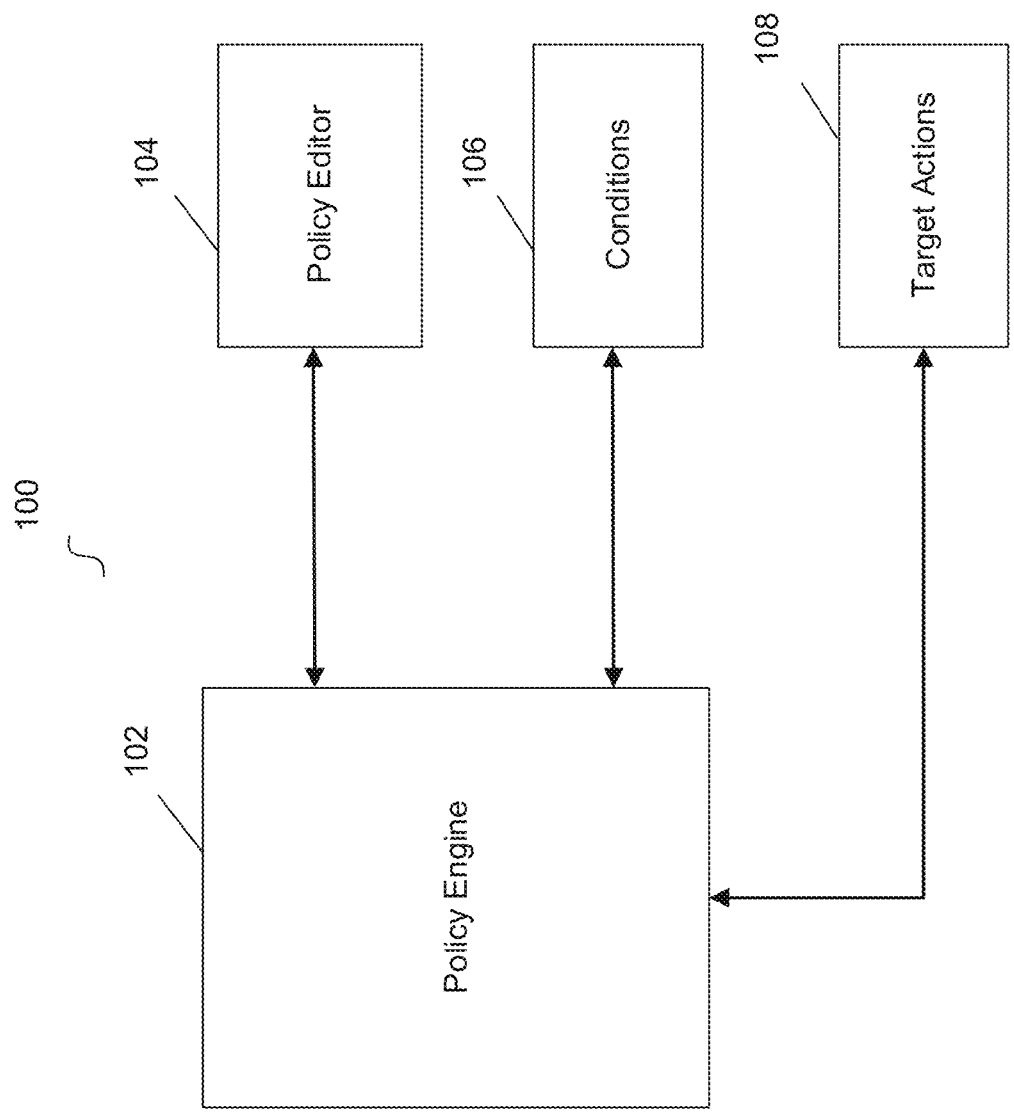
FIG. 1 illustrates a system for governing cloud environments using a policy engine according to an example embodiment.

FIG. 1 illustrates a system for governing cloud environments using a policy engine according to an example embodiment. System 100 includes policy engine 102, policy editor 104, conditions 106, and target actions 108.

Embodiments of the policy engine 102 can perform the following functions:

Validating and converting policies defined using a policy editor to policy expressions using policy grammar specifications and storing those policy expressions (e.g., in a database).

Connecting policies with process scheduler scheduling mechanisms.

Connecting policies with internal and external events.

Managing security constraints for the policies.

Executing policy expressions.

In some embodiments, policies are created and managed through policy editor 104. For example, policy editor 104 can abstract the complexities of defining and managing policies, such as by providing a simplified user interface. Conditions 106 can include the conditions for triggering a policy (e.g., as defined using the policy editor). Target actions 108 can include the one or more actions to take when a policy has been triggered. For example, policy editor 104 can be used to define target action(s) for a policy.

Figure 2:
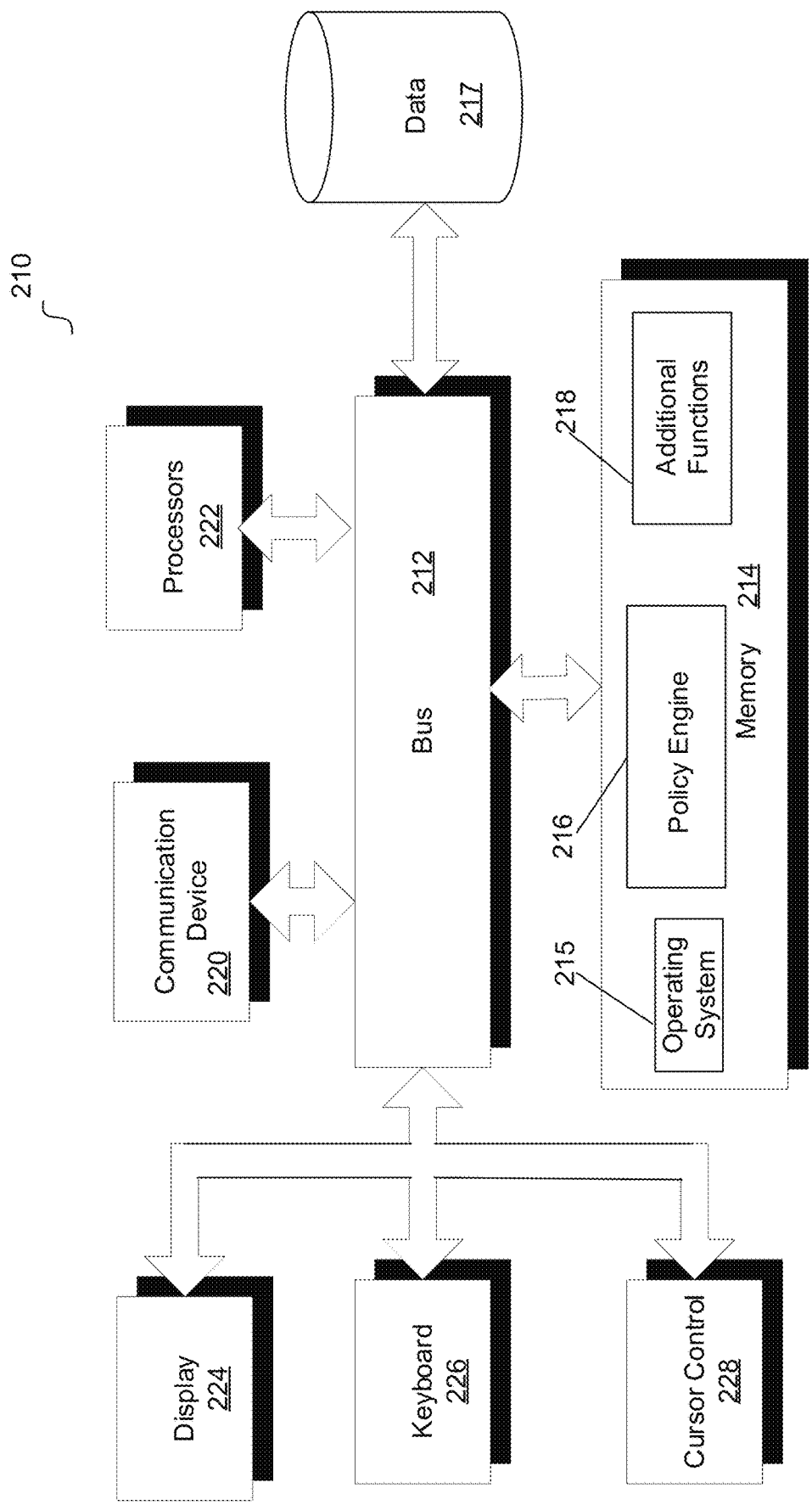
FIG. 2 illustrates a block diagram of a computing device operatively coupled to a prediction system according to an example embodiment.

FIG. 2 is a block diagram of a computer server/system 210 in accordance with embodiments. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, policy engine 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 210. The modules can include an operating system 215, policy engine 216, as well as other applications modules 218. Operating system 215 provides operating system functionality for system 210. Policy engine 216 may provide system functionality for governing managed environments, or may further provide any other functionality of this disclosure. In some instances, policy engine 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210.

In some embodiments, system 210 can be part of a larger system. Therefore, system 210 can include one or more additional functional modules 218 to include the additional functionality. Other applications modules 218 may include the various modules of Oracle® Cloud Infrastructure ("OCI"), Oracle® Cloud Infrastructure Data Science, Oracle® PeopleSoft, and Oracle® PeopleSoft Cloud Manger, for example. A database 217 is coupled to bus 212 to provide centralized storage for modules 216 and 218. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.).

In an embodiment, system 210 may be separate from the device, and may remotely provide the described functionality for the device. Further, one or more components of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

Conventional software does not readily permit defining policies for administering and automating different use cases, such as managing life cycle activities of environments in the cloud (e.g., managed environments). Consider an example use case-A cloud administrator would like to schedule backup of all environments. To achieve this in conventional systems, a cloud administrator may have to implement code (e.g., PeopleCode in an AE program) with software logic, such as logic to call an API's for performing the backup, then create a recurrence definition through process scheduler and associate code (e.g., the AE program) with the recurrence definition. This workflow includes unnecessary effort and requires unnecessary human expertise. Several other use cases are also relevant to such a cloud administrator (e.g., Scheduling refresh, start/stop of environments, and the like). Writing custom code and maintaining this code for many different use cases can cause operational issues, and even eventually turn the entire system to an unmanageable state. Further, conventional systems do not include in-built mechanisms that permit a cloud administrator to connect policies through events.

Embodiments implement a policy driven governance framework that simplifies the way cloud administrators (or users) can define policies to administer different use cases. For example, policies can be defined and managed through a user interface. Embodiments of the framework provide out of the box support for scheduling policies as well as connecting policies with internal and external events. For example, cloud administrators can define and expose custom objects through PeopleCode and add policies for those objects.

In some embodiments, a policy has two parts—conditions and actions. Consider an example use case—a cloud administrator would like to schedule backup of all environments every Friday at 10 PM. From this a condition and policy action can be interpreted: condition—Execute the policy at 10 PM every Friday; action—Backup all environments. Embodiments of a policy can have multiple conditions which are connected (e.g., logically using logical operators (AND/OR)), and one or more actions (or a single action to limit ambiguities). In some embodiments, the policy editor abstracts the complexities of defining and managing the policies.

Figure 3:
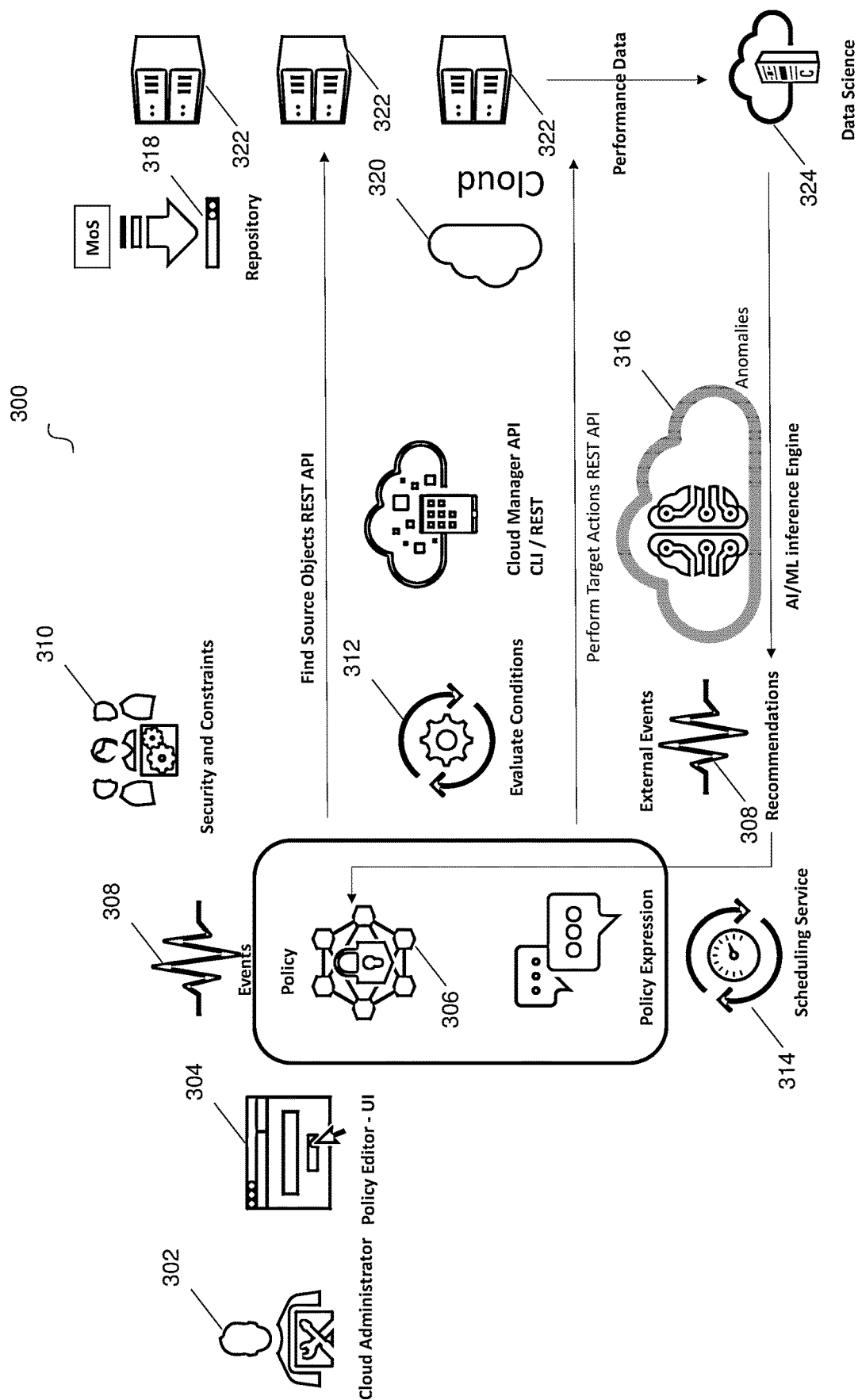
FIG. 3 illustrates framework for governing cloud environments using a policy engine according to an example embodiment.

FIG. 3 illustrates framework for governing cloud environments using a policy engine according to an example embodiment. System 300 of FIG. 3 includes cloud administrator 302, policy editor 304, policies 306, events 308, security and constraints 310, condition evaluator 312, cloud manager 314, artificial intelligence ("AI")/machine learning engine ("ML") engine 316, repository 318, cloud 320, managed environments 322, and data science cloud 324. In some embodiments, cloud administrator 302 (or any user adequate security) can use policy editor 304 to define policies 306. For example, the defined policies 306 can each have one or more conditions and one or more actions.

In some embodiments, security and constraints 310 can secure policy creation/editing based on permissions. For example, policies set by certain users (e.g., cloud administrator 302) can have a global scope, meaning those policies are enforceable globally (e.g., across numerous managed environments). In some embodiments, other users can define policies on the environments that are associated with the user. For example, a user policy can be enforced on the environments associated with that specific user. Embodiments of security and constraints 310 can be used to set scope for policies, which can allow greater control on the functioning of the system.

In some embodiments, events 308 (e.g., internal events within a managed environment or external events) can trigger conditions of defined policies 306. For example, condition evaluator 312 can monitor events 308 and evaluate whether conditions for one or more defined policies 306 have been met. In some embodiments, the policy driven governance framework has built-in eventing mechanisms using push notification (PN) events. For example, policies can be executed in real-time as a result of occurrence of certain events 308.

In some embodiments, events 308 can be internal (triggered from within the system) or can be external (triggered from outside). Examples for internal event triggers are a download of new software (e.g., PeopleTools infra DPK) or application update image, detecting an anomaly within the domains of an environment (e.g., through a machine learning model), and the like. In some embodiments, these events can be used to trigger defined policies 306 and defined actions like updating CPU patches on the environments (e.g., when a new infra DPK becomes available) or executing autoscaling rules on the environment where the anomaly is detected.

In some embodiments, policies 306 can also be triggered by external events. Example use cases include support for Oracle Cloud Interface Events. For example, OCI events can be triggered when a state change occurs on the resources comprising the provisioned environments. Such OCI events can be plugged into embodiments of the policy framework so that actions can be performed on them.

In some embodiments, scheduling service 314 can trigger conditions of defined policies 306, for example based on defined policies 316 with timing conditions. Embodiments of the policy driven governance framework can have in-built support for scheduling policies through scheduling service 314. Examples use cases include scheduling policy actions such as environment start/stop, backup, refresh, scale up, scale down, and the like. For example, a policy can be scheduled ad hoc (e.g., scheduled at a date and time) or can be connected to a process scheduler recurrence so as to execute the policy in a periodic fashion. A user (e.g., cloud administrator 302) can schedule a policy based on exposed features (e.g., by the PeopleTools process scheduling service 314).

In some embodiments, cloud 320 can host managed environments 322. The actions defined in policies 306 can be performed on the managed environments 322 when defined conditions are triggered. For example, a cloud manager application programming interface ("API") can be used to perform these actions at cloud 320/on the managed environments 322.

In some embodiments, data science cloud 324 can host AI/ML engine 316. In some embodiments, AI/ML engine 316 can detect anomaly conditions, such as load conditions that deviate from normal conditions. In some embodiments, a machine learning model can be configured to monitor load for managed environments and predict anomaly conditions. When an anomaly condition is predicted, an event (e.g., events 308) can be triggered (e.g., push notification for an event), which the policy engine can process (e.g., compare to defined policies to trigger policy actions).

In some embodiments, anomaly detection is performed by embodiments of the cloud manager, where real-time data is collected and predicted by AI/ML engine 316. For example, AI/ML engine 316 can make external application programming interface ("API") calls (e.g., REST API calls) to data science cloud 324 for prediction. When a positive anomaly is detected, AI/ML engine 316 can transmit an internal notification (e.g., an internal event).

In some embodiments, subscribers to this event (e.g., policies that cover environments with conditions based on this event) can have policy actions performed, such as scale-up or scale-down. PeopleSoft cloud manager has an Elastic Search node, which can collect metrics from managed environments in defined intervals. In some embodiments, real-time performance data from running the managed environments can be collected and stored, such as in object storage. For example, these metrics indicate the load on the application server domains, process scheduler domains, and Pure Internet Architecture ("PIA") domains running on those managed environments. Data science cloud 324 can read the performance data, train one or more models and publish these models (e.g., within data science cloud 324). After a model is published, real-time data fragments can be sent to prediction endpoints to detect user spikes or anomalies. When an anomaly condition is detected by AI/ML engine 316, an internal event is raised.

For example, to deploy AI/ML anomaly detection, the following can be performed. An administrator can deploy a distributed PeopleSoft environment (e.g., in the cloud). The administrator can then define/deploy a scaling policy for the managed environment. Performance data can be collected from distributed services running on multiple VMs/containers (e.g., for the managed environment). Machine learning model(s) that predict anomalies, user spikes, and/or user drips can be trained and published. Performance snapshots (e.g., performance data over a window of time) can be sent to/accessible by the trained model(s) to detect an anomaly. On detection of an anomaly, it is determined whether scaling up or scaling down condition(s) are met (e.g., introspect to see if the trend is linear, filtering out intermittent spikes and false positives). When a scaling up or scaling down condition is met, the scaling up or down of services (e.g., cloud computing resources) can be automatically performed.

In some embodiments, defined policies can include conditions to automatically accept recommendations from the AI/ML engine 316 once an anomaly is detected. For example, anomaly detection can be used to scale the hardware used to implement the managed environments covered by defined policies. The hardware can include machines of various operating conditions that can implement a heterogenous computing environment (e.g., mix of linux and windows machines that operation various cloud based applications). In some embodiments, the policy actions triggered by an anomaly detection can include scale up or scale down for one or more managed environments. For example, managed environments can include a number of implemented virtual machines/servers (e.g., hardware nodes) in various domains (e.g., e.g., application domain server, process scheduler domain, Pure Internet Architecture ("PIA") domain). In some embodiments, the scale up/scale down policy action can include parameters such as the number of nodes to scale, the domains to scale (e.g., application domain server, process scheduler domain, PIA domain), and the like.

Figure 4:
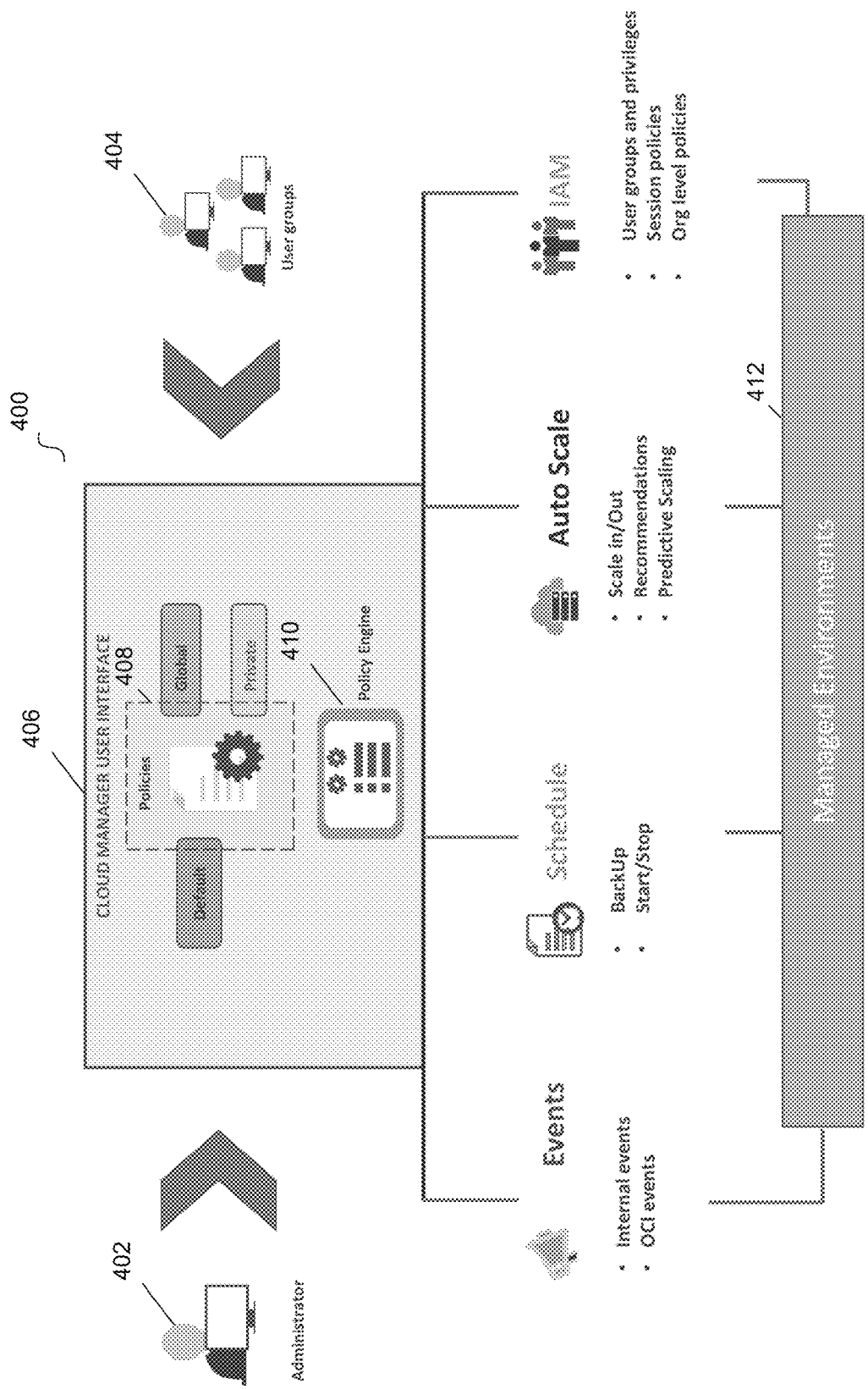
FIG. 4 illustrates a cloud manager according to an example embodiment.

FIG. 4 illustrates a cloud manager according to an example embodiment. System 400 includes administrator 402, user groups 404, cloud manager interface 406, policies 408, policy engine 410, and managed environments 412. In some embodiments, administrator 402 and/or user groups 404 can interact with cloud manager interface 406 to define policies 408. For example, the defined policies 408 can include conditions and actions. In some embodiments, user groups 404 can define policies 408 with a local scope, such as policies that govern managed environments 412 related to the user group that defined/created the policy. For example, user groups 404 may be granted privileges to govern certain of managed environments 412. In some embodiments, administrator 402 can define policies 408 with a local scope (e.g., limited to a subset of managed environments 412) or a global scope (e.g., impacts all of managed environments 412).

In some embodiments, policy engine 410 can trigger one or more defined policies 408 based on a defined schedule and/or can monitor conditions (e.g., internal or external events) to detect when one or more defined policies 408 have been triggered. Some actions that can be implemented by policy engine 410 to govern managed environments 412 based on a triggered policy include autoscaling cloud resources up or down, starting/stopping a managed environment, backing up a managed environment, and the like.

Figure 5:
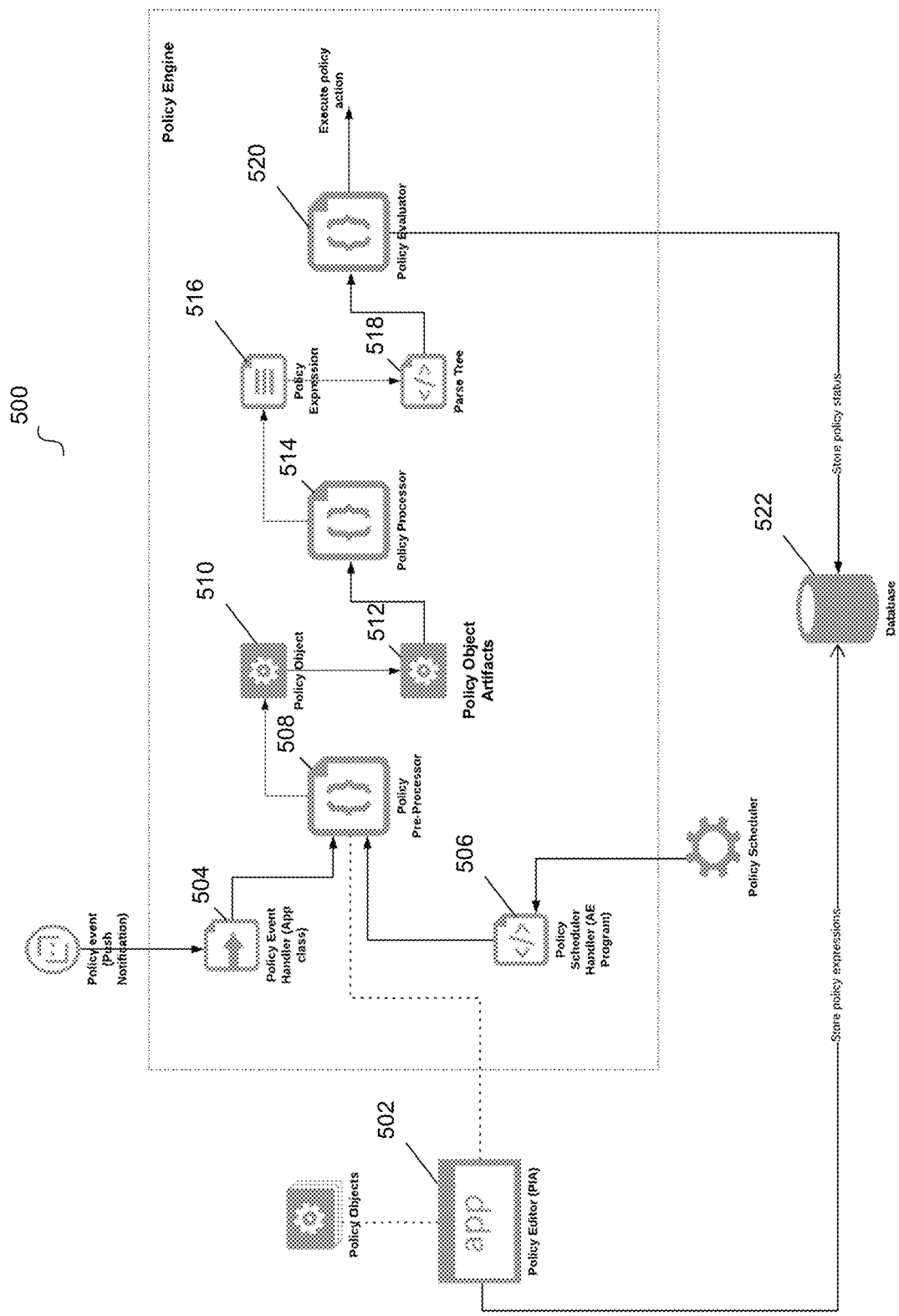
FIG. 5 illustrates sample functionality for governing cloud environments according to an example embodiment.

FIG. 5 illustrates sample functionality for governing cloud environments according to an example embodiment. In some embodiments, when policies are triggered for execution, policy scheduler handler 504 or policy event handler 506 can invoke the policy pre-processor 508. For example, in case of scheduled policies, policy pre-processor 508 can retrieve from database 522, the policy mapped with the schedule that became due and can invoke policy processor 514 to process the policy. In some embodiments, policy objects 510 are created and APIs are available for exposing/retrieving policy object artifacts 512.

In some embodiments, policy processor 514 is responsible for processing policy expression 516 and evaluating policy object artifacts 512 against policy expression 516. Embodiments store polices added through the policy editor 502 in database 522 as a policy expression. An example below demonstrates a policy expression generated for a policy: Start environments with names HCMFT1 and HCMFT2. Note that this policy expression may be associated with some schedule, such as: IF 'Environment'.'Name' In 'HCMFT1', 'HCMFT2' AND 'Environment'.'Status' Is 'stopped' THEN 'Environment'.'Start.

In some embodiments, policy expressions are based on a pre-defined grammar, which means policy expressions comply with a syntax and semantics of the grammar. The following represents an example grammar in accordance with some embodiments. Each policy expression can have a structure, such as the example structure: IF <conditions> THEN <action>. In some embodiments, grammar for the policy expressions can be defined, and any suitable grammar can be used. For example, ANother Tool for Language Recognition ("ANTLR") is a grammar builder and parser generator tool. Grammar represents the syntax and semantics of policy expressions and is composed of multiple rules. Thus, given a grammar, lexer and parser modules (e.g., java classes) can be generated from the grammar using the ANTLR tool. In some embodiments, rule expressions are generated using ANTRL based grammar specification. Implementations can use ANTLR java runtime binaries jar, for example as a third party library with a Cloud Manager deployment for generating/executing rule expressions.

Below is a sample Policy Expression grammar. The rules in the grammar are expressed in top to bottom order.

```
grammar PolicyGrammar;
@header {
package com.peoplesoft.pa.cl.governance.policyengine.grammar; import
java.util.ArrayList;
}
  policy : 'IF' conditions 'THEN' action;
  conditions locals[ArrayList<PolicyElement> policyElements = new
ArrayList<PolicyElement>( );]:
    c1=condition { $policyElements.add($c1.ctx.conditionObj); }
    ((('AND' {$policyElements.add(new
PolicyRelation(PolicyRelation.Relation.AND)); }
    |'OR' { $policyElements.add(new PolicyRelation(PolicyRelation.Relation.OR));})
    ('(' { $policyElements.add(new
PolicyRelationGroup(PolicyRelationGroup.Group.START));})? ) c2=condition {
$policyElements.add($c2.ctx.conditionObj); }
    (')' { $policyElements.add(new
PolicyRelationGroup(PolicyRelationGroup.Group.END)); })*? )*;
    //(is used to indicate start of a group and ) for end of a group condition
locals[PolicyCondition conditionObj = new PolicyCondition( );]:
rule_variable[$conditionObj];
    rule_variable [PolicyCondition conditionObj]:
    rule_entity (
    'Is' Value {
$conditionObj.setConditionOperator(PolicyCondition.Conditionoperator.IS); }
    | 'In' value_group {
$conditionObj.setConditionOperator(PolicyCondition.ConditionOperator.IN); }
    );
    rule_entity: feature_entity; feature_entity: Value '.' Value;
    value_group locals [ArrayList<String> values = new ArrayList<String>( );]:
v1=Value { $values.add($v1.getText( ).toLowerCase( )); } ('.' v2=Value {
$values.add($v2.getText( ).toLowerCase( )); })*; action: feature_entity;
    IS : 'Is';
    IN : 'In';
    Value: '\'' String ((WS | '.') String)* '\'';
    String: [A-Za-z0-9_-]+;
WS : [ \t\r\n]+ -> skip;
```

Figure 8A:
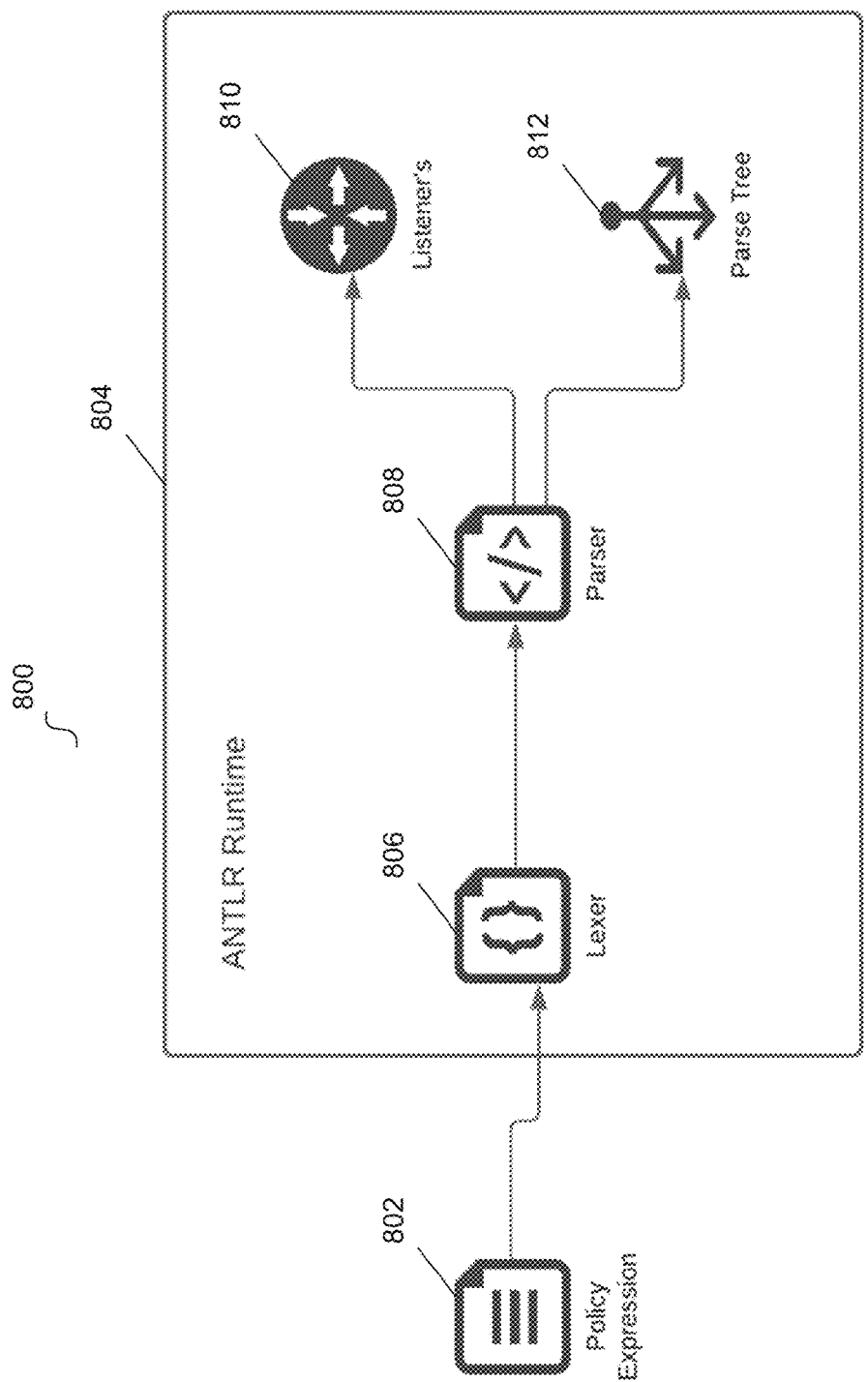
FIG. 8A illustrates a policy expression module according to an example embodiment.

In some embodiments, ANTLR can generate source code (e.g., java code) files from the grammar specification. For example, generated lexer and parser modules along with the ANTLR run-time can perform parts of the processing for policy expressions. FIG. 8A illustrates a policy expression module according to an example embodiment. A policy expression 802 can be processed by ANTRL runtime 804. For example, lexer 806 and parser 808 can be generated based on a grammar specification. The policy expression 802 is expected to comply with this grammar specification in order for the ANTRL runtime to process the expression.

In some embodiments, lexer 806 can be a class responsible for deconstructing the input policy expression as a set of tokens. In some embodiments, parser 808 can be a class that contains logic for parsing the policy expression based on the grammar rules such that parse tree 812 is generated. For example, lexer 806 can feed tokens to parser 808 to construct a parse tree 812.

In some embodiments, a context class for each rule defined in the grammar can be generated. Listener 810 can be generated listener classes that contains logic to implement callbacks while navigating parse tree 812. For example, objects for the rule context classes can be generated through the listener. In some embodiments, an ANTLR 4 runtime jar can be present in a CLASSPATH while executing policy expressions.

In some embodiments, a walk of parse tree 812 can be performed to construct rule context objects using a listener 810. Returning to FIG. 5, policy object artifacts 512 that are fed to policy processor 514 can be used as input to evaluate policy expression 516, for example using listener 810 and rule context objects. Parse tree 512 of FIG. 5 can be generated in a manner similar to parse tree 812 of FIG. 8A.

Figure 8B:
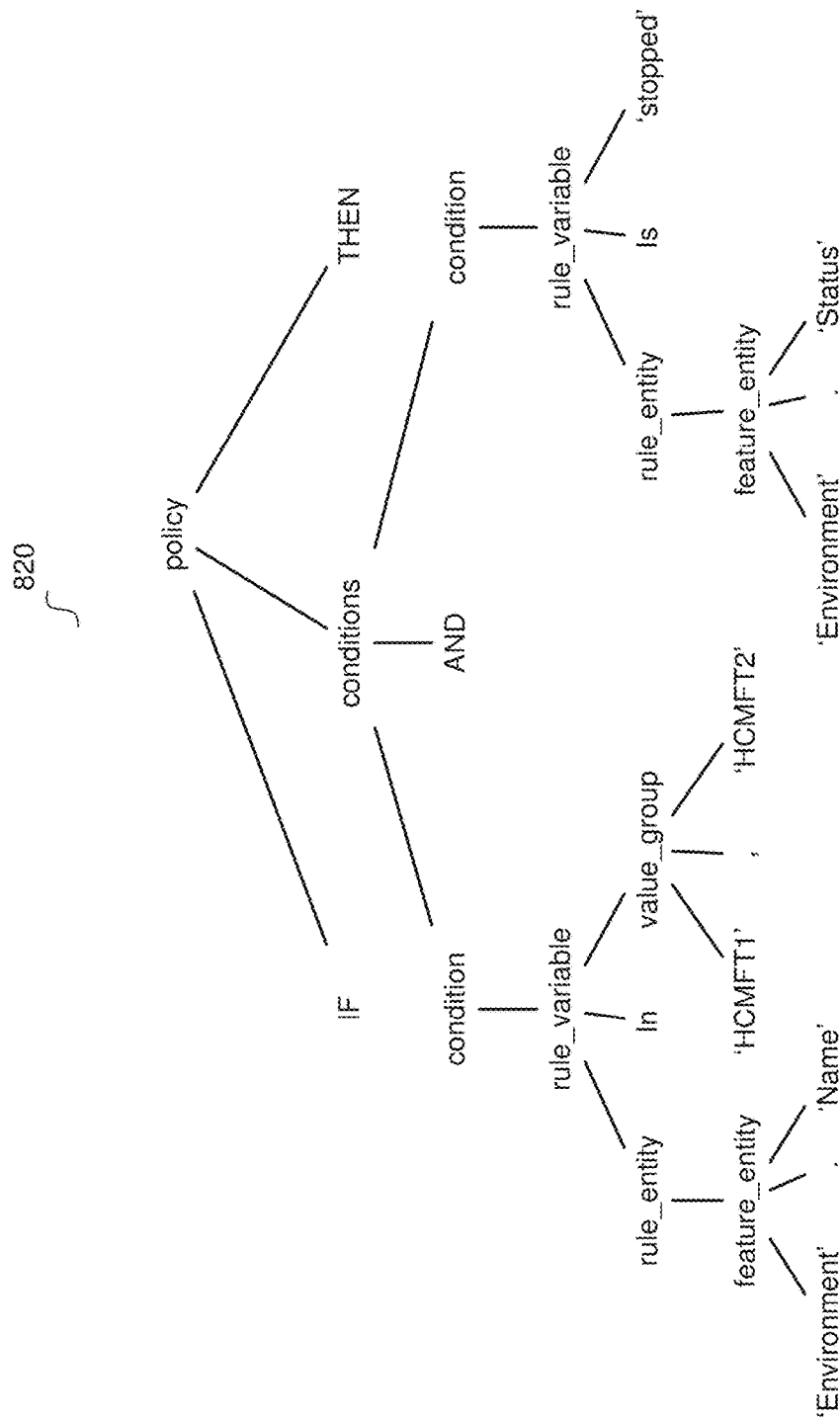
FIG. 8B illustrates a parse tree according to an example embodiment

FIG. 8B illustrates a parse tree according to an example embodiment. Parse tree 820 is a parse tree of the following example policy expression according to some embodiments: IF 'Environment'.'Name' In 'HCMFT1', 'HCMFT2' AND 'Environment'.'Status' Is 'stopped' THEN 'Environment'.'Start'

In some embodiments, policy evaluator 520 is responsible for evaluating policy expressions 516. For example, policy object artifacts 512 (e.g., JavaScript Object Notation ("JSON") objects) can be retrieved by policy processor 514 from the policy object associated with the policy expression (e.g., stored at database 522). In some embodiments, policy evaluator 510 can use policy object artifacts 512 to evaluate policy expression 516. In some embodiments, evaluation of policy expression 516 can include comparing the data contained in policy object artifacts 512 with the data contained in the rule context objects (e.g., the data that is part of the policy expression). For example, if policy evaluator 520 evaluates the policy conditions as TRUE, then a corresponding action for the policy can be executed.

In some embodiments, comparing policy object artifacts 512 with the data contained in the rule context objects includes comparing the metadata in policy object artifacts 512 against the rule elements defined in the policy conditions. For example, policy object artifacts 512 can represent input to execute the policy. In some embodiments, each policy artifact object is a JSON object (set of key-value pairs). For example, a policy artifact for the Environment policy object has the following JSON structure, that has the environment name and the environment status.

```
{
  "name":   "HCMDemo",
  "status": "Running"
}
```

In this example, the policy conditions has rule elements defined using the properties exposed by the Environment policy object (e.g., name and status). In some embodiments, the metadata in policy object artifacts 512 is compared with the rule elements in the policy conditions during evaluation of the policy expression, for example by parsing the policy expression tree.

Figure 6:
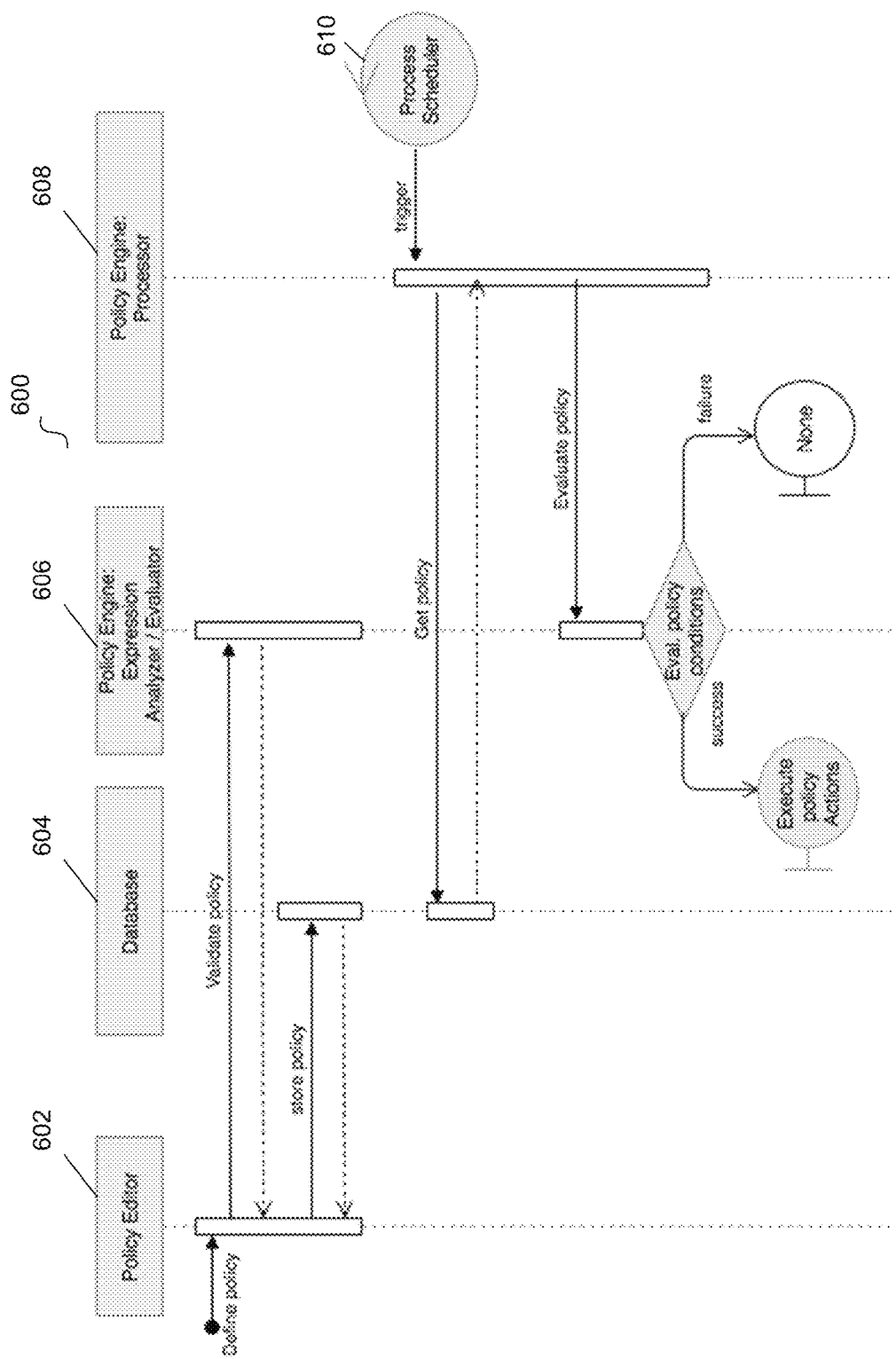
FIGS. 6-7 illustrate sequence diagrams for governing cloud environments according to an example embodiment.
Figure 7:
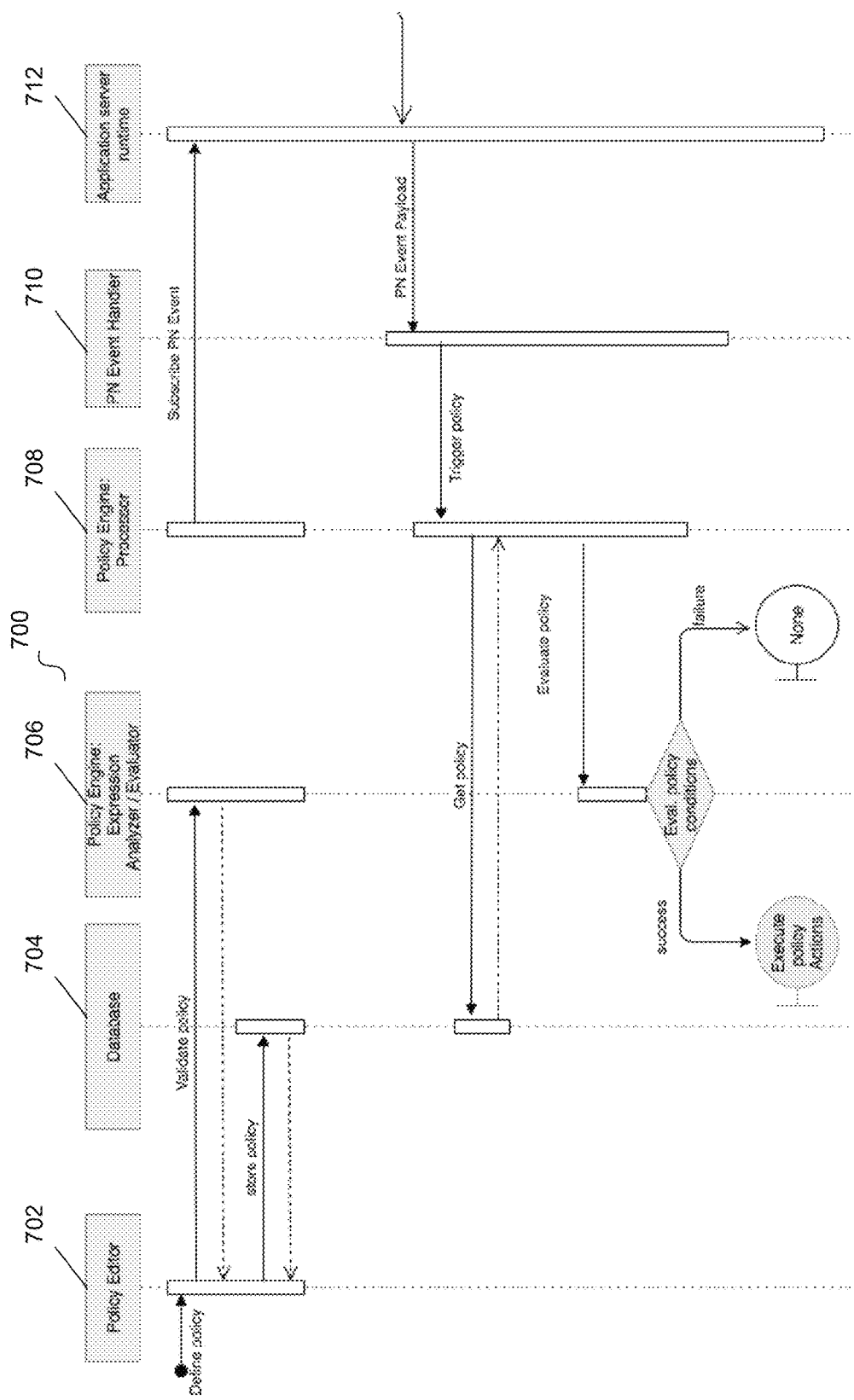

FIGS. 6-7 illustrate sequence diagrams for governing cloud environments according to an example embodiment. Sequence 600 of FIG. 6 demonstrates a sample sequence of activities with a policy scheduler that occur from the point where a policy is defined until execution according to some embodiments. For example, policy editor 602 can be used to define a policy, and the policy can be validated by policy engine 606 and stored at database 604. Process scheduler 610 can invoke policy engine 608 when the schedule associated with the policy becomes due, and policy engine 608 can retrieve the policy from database 604. Policy engine 608 can then evaluate the policy, and if the policy conditions are met, execute the one or more policy actions.

Sequence 700 of FIG. 7 demonstrates a sample sequence of activities based on events that occur from the point where a policy is defined until execution according to some embodiments. In some embodiments, for policies based on events, policy engine 708 can subscribe for push notification (PN) events. For example, policy editor 702 can be used to define a policy, and the policy can be validated by policy engine 706 and stored at database 704. Policy engine 708 can then subscribe for push notification events from application server runtime 712.

Application server runtime 712 can observe or experience an event, an event payload can be sent to event handler 710, and event handler 710 and invoke policy engine 708. Policy engine 708 can retrieve the policy from database 704. In some embodiments, when a PN event occurs on the system, application server runtime 712 can propagate the event to event handler 710 (e.g., a PeopleCode application class). For example, embodiments of event handler 710 invoke policy engine 708, which can read the policy from database 704 and execute them. Policy engine 708 can evaluate the policy, and if the policy conditions are met, execute the one or more policy actions.

In some embodiments, an event (e.g., push notification received about an event) can trigger a scheduled action. For example, a download manager can be used to automatically download patches or updates relevant to different managed environments (e.g., patches for cloud applications that run in the managed cloud environments). A repository artifact policy object (e.g., an object related to downloaded patches/updates) can be defined/created with conditions that correspond to various downloaded patches or updates (e.g., platform, product, release, and the like). When the downloaded patch or update meets the policy conditions, the corresponding defined policy action can be a scheduled time to execute the patch or update, such as a day of the week and time of day (e.g., Sunday at 2:00 pm) so that updates/patches can be made at low activity times. In some embodiments, the defined/created policy object can cover multiple managed environments. In other words, once policy conditions are met by an event (e.g., push notification about a downloaded patch/update) the policy action can be executed for multiple managed environments (e.g., which are also defined in the policy conditions).

In some embodiments, a policy expression can be constructed using a policy object. Consider the following example policy expression: IF 'Environment'.'Name' In 'HCMFT1', 'HCMFT2' AND 'Environment'.'Status' Is 'stopped' THEN 'Environment'.'Start'. The conditions and action portions of this example policy expression can be constructed using the policy object "Environment". For example, a policy object can represent a functional entity (in this example, a CM environment type is represented as a policy object) and can expose its properties and methods. In some embodiments, policy expressions can be constructed using the properties and methods exposed by these policy objects. In this example 'Name' and 'Status' are properties of the 'Environment' policy object while 'Start' is a method of the policy object. In some embodiments, the condition part of a policy expression comprises properties, while the action part comprises a method. For example, the method specified in the action part can be invoked by the policy engine if the conditions are evaluated as 'True'.

In some embodiments, custom policy objects can be defined using an interface (e.g., PeopleCode) and those custom policy objects can be used to construct policies through Policy Editor. The following table lists example properties and methods exposed by inbuilt policy objects according to some embodiments.

| Policy Object | Type | Class | Sample Properties | Sample Methods |
|---|---|---|---|---|
| Environment | Builtin | EnvironmentPolicy Object | Name: Name of Environment Status: Status of the environment (ex: Running, Stopped) | Start Stop |
| Repository Artifacts | Builtin | RepositoryArtifact PolicyObject | Type: Type of the downloaded artifact Platform: OS platform of the downloaded artifact Product: Product the downloaded artifact belongs to Release: Product Release the downloaded artifact belongs to | Update Environment |

In some embodiments, the policy objects are used in the policy editor UI, so that policies can be created using those objects. For example, a Policy object class can implement the example methods getProperties( ) and getMethods( ) to expose metadata of the properties and methods it contains. In some embodiments, while processing scheduled policies, policy engine can retrieve the policy object artifacts so that those artifacts can be fed to the policy processor as input while processing policy expressions. For example, policy processor can take each policy object artifact and evaluate the policy expression using that artifact. A policy object class can implement the method getPolicyObjects( ) to expose policy object artifacts for scheduled policies.

In some embodiments, for passing a policy object artifact to policy engine for execution, as a result of an event, the policy object class can implement the method getPolicyObject(JSONObject eventPayload). For example, policy engine can invoke this method of the policy object passing the event payload and expect, in return, the policy object artifacts for the policy processor (e.g., for feeding the policy processor, as input, while processing policy expressions).

In some embodiments, the policy engine can execute a policy action when the policy conditions are evaluated to true. In the case of the following example policy expression, the policy engine can create an instance of the 'Environment' policy object and then invoke the method 'start' on the policy object: IF 'Environment'.'Name' In 'HCMFT1', 'HCMFT2' AND 'Environment'.'Status' Is 'stopped' THEN 'Environment'.'Start'

In some embodiments, the logic for each policy action can be implemented in a separate class. For example, each policy action class can expose a JSON object representing the properties needed for executing the policy action logic. This allows policy processor to invoke different policy actions by passing the set of properties for those policy action objects. An example action where this will be useful is provisioning a new environment, which requires several pieces of input data. In some embodiments, this data can be passed as properties to the corresponding action object.

In some embodiments, a process scheduler process ECL_POL_SCHD. ECL_POL_SCHD (e.g., an AE program) can be implemented that can be scheduled when a policy is activated (e.g., if the policy is a scheduled policy). For example, users can define policies, where the schedule can be either ad hoc (e.g., fixed date and time) or recurring (associated with a process scheduler recurrence definition). In some embodiments, a unique "run control id" can be generated each time a policy is scheduled. This run control id can be associated with the instance of the AE program (ECL_POL_SCHD), that is responsible for the schedule. In some embodiments, when the schedule becomes due, the process ECL_POL_SCHD can be executed, which can internally trigger policy engine to execute the policy associated with the run control id. For example, this way adding or changing schedules for a policy any number of times will not adversely affect the policy execution.

In some embodiments, policies are also connected with events using Push Notification (PN) eventing mechanism. For example, policies can be triggered when a PN event occurs. Example use case is "Performing an environment update, when a new Infra DPK is downloaded in CM". In some embodiments, a PN event definition named CM_POLICY_EVENT. CM_POLICY_EVENT can have the following example structure.

| Key Name | Description |
| --- | --- |
| Type | Name of the policy object class for which the event is intended for |
| KEY1 | Key on which custom data can be passed |
| KEY2 | Key on which custom data can be passed |
| KEY3 | Key on which custom data can be passed |
| ... | |

For example, the PN event CM_POLICY_EVENT can be subscribed through PeopleCode using the following:

```
Local object &EventObject;
&EventObject = CreateObject("PSEvent");
&EventObject.Subscribe("CM_POLICY_EVENT",
"ECL_CM:Governance: PolicyEventHandler:OnEvent");
```

In some embodiments, the PeopleCode application class ECL_CM:Governance:PolicyEventHandler can act as an event handler component for the CM_POLICY_EVENT event. When a CM_POLICY_EVENT event is raised from an application server runtime, "OnEvent" method ECL_CM:Governance:PolicyEventHandler can be invoked with the event payload. In some embodiments, the application class can create an instance of the policy object using the metadata in the event payload and invoke the policy engine to process the policies associated with that policy object.

Figure 9:
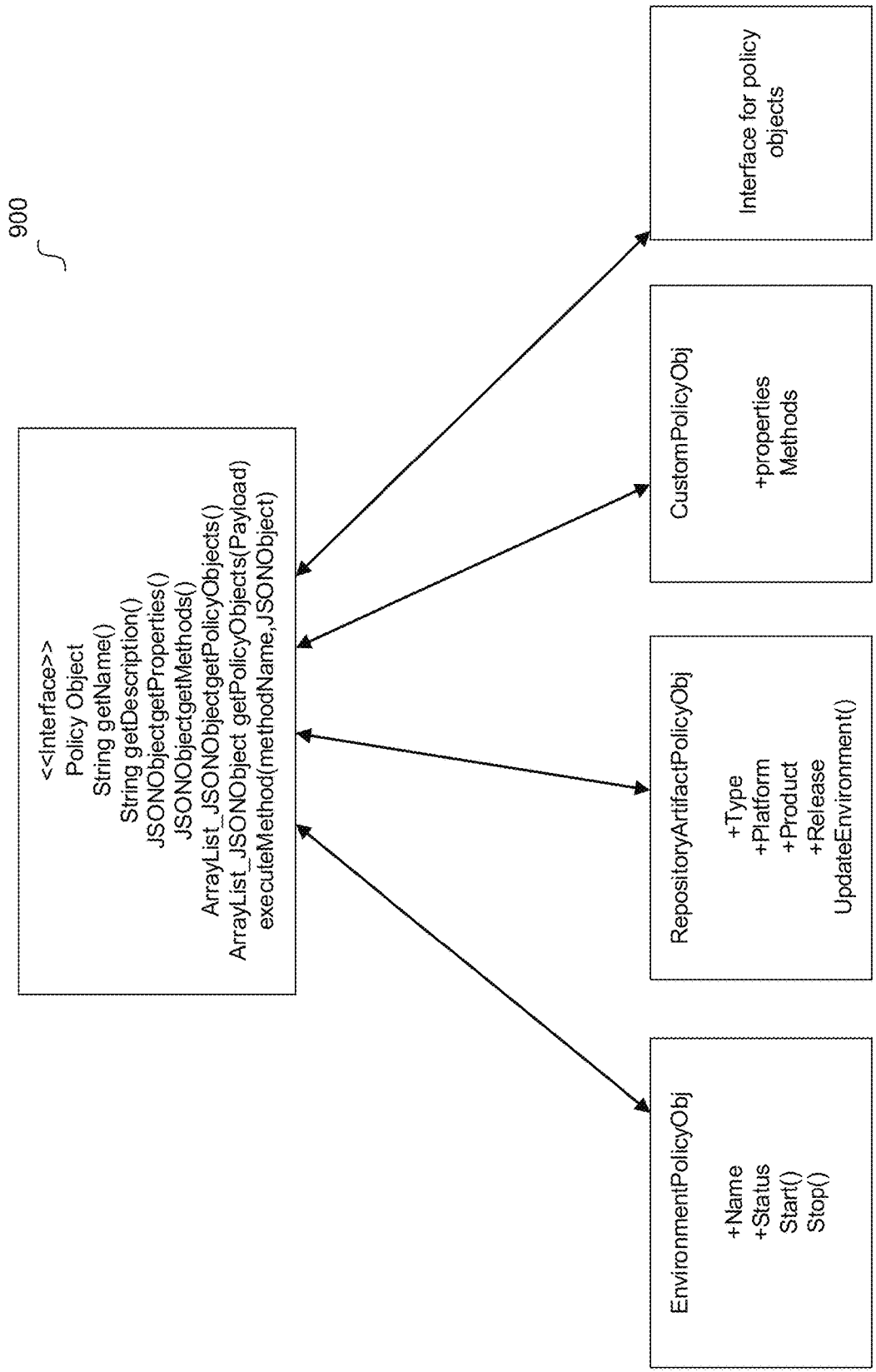
FIGS. 9-10 illustrate policy objects according to an example embodiment.
Figure 10:
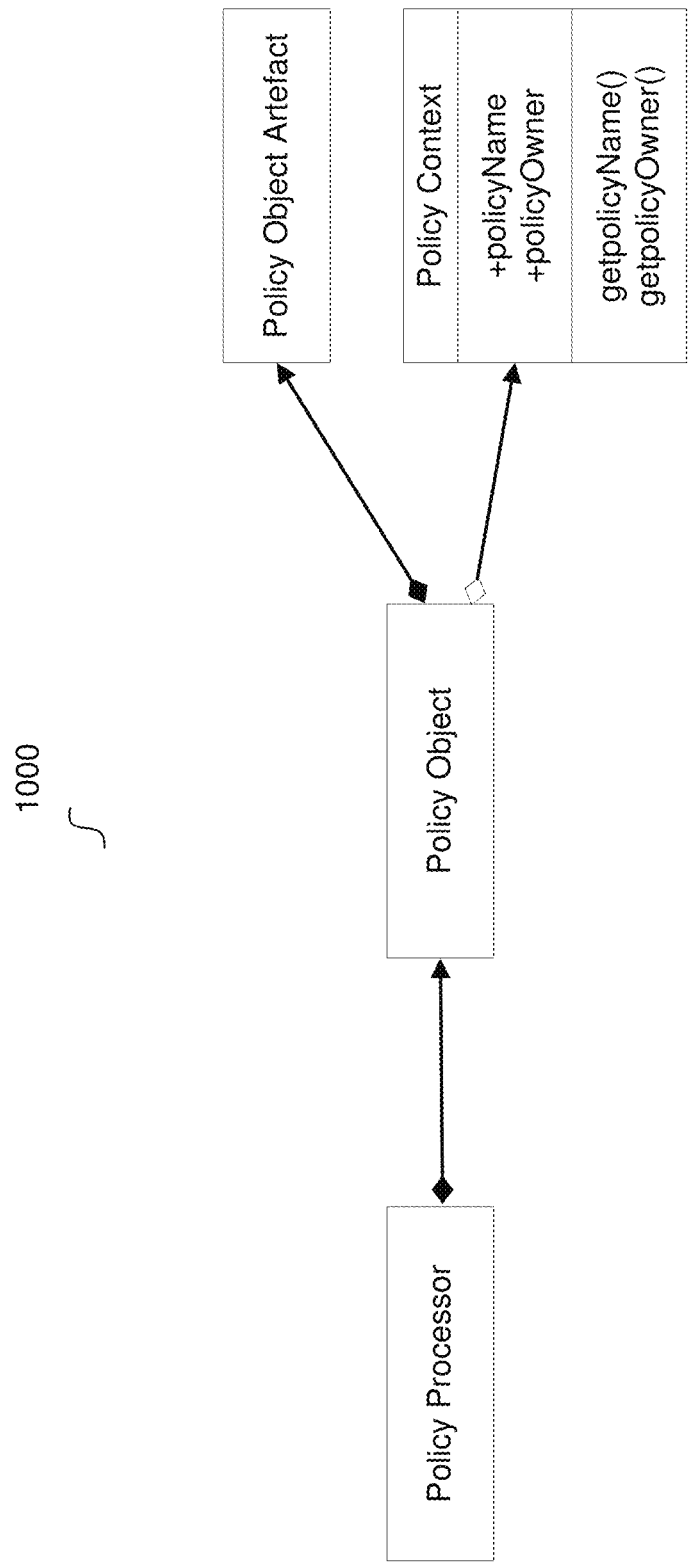

FIGS. 9-10 illustrate policy objects according to an example embodiment. Class diagram 900 of FIG. 9 illustrates an example java class hierarchy for policy objects. For example, concrete policy object classes can expose properties and methods for the functionality they represent. A policy object class can implement the 'PolicyObject' interface.

In some embodiments, the policy objects implemented can be extensible and a user can create custom policy objects. For example, users can define policies using those custom policy objects to meet custom requirements. In some embodiments, a policy object class can expose one or more properties. The 'getProperties' method in the policy object class can return a JSON object containing an array of properties. For example, each object in the array can be a JSON object containing the keys: name, description and values. The following shows the example property 'Status' for the 'Environment' policy object. The "values" array can be kept empty if the property does not expect a predefined value.

```
{
"name": "Status",
"description": "Status of environment",
"values": ["Running", "Stopped"]
}
```

In some embodiments, the 'getMethods' method can return a JSON object containing an array of methods exposed by the policy object. For example, each method in the JSON array can be a JSON object with the following keys: name and description. The following shows an example method.

```
{
"name": "Stop",
"description": "Stops the environment"
}
```

3.3.1.3 Adding Support for Scheduled Policies

In some embodiments, when a scheduled policy becomes due (e.g., is triggered based on meeting its conditions), policy processor can invoke the method 'getPolicyObjects' on the policy object class. For example, the 'getPolicyObjects' method can return an array of JSONObject's. Each JSONObject in the array can contain the properties and their values representing a single policy object artifact. As an example, the policy object 'Environment' can contain the properties 'Name' and 'Status'. The 'getPolicyObjects' method can return the array of JSONObject's where each JSONObject can contain the property values representing a single 'Environment' policy artifact as shown below:

```
{
"Name": "HCMPUM",
"Status": "Running"
}
```

In some embodiments, a policy object class can implement the method 'getPolicyObjects(JSONObject eventPayload)' in order to connect the policies with events. For example, when an event occurs, the policy engine can identify if it is related to a particular policy object. In that case the 'getPolicyObjects' of the policy object can be invoked by passing the event payload. This method can return an array of JSONObject's, each containing the property values of a single policy object.

Class diagram 1000 of FIG. 10 illustrates a policy context object. For example, class diagram 1000 shows that embodiments of the policy processor can create and associate a PolicyContext object with each policy object while processing the policy expression. In some embodiments, while processing the policy expression, the Policy Processor can set the owner for the policy object instance (in case of the environment policy object, owner can be the user who created the environment) using the API provided by PolicyContext. In some embodiments, policy engine can use the owner details from the policy object and the policy definition to determine whether to execute a policy expression or not.

Figure 11:
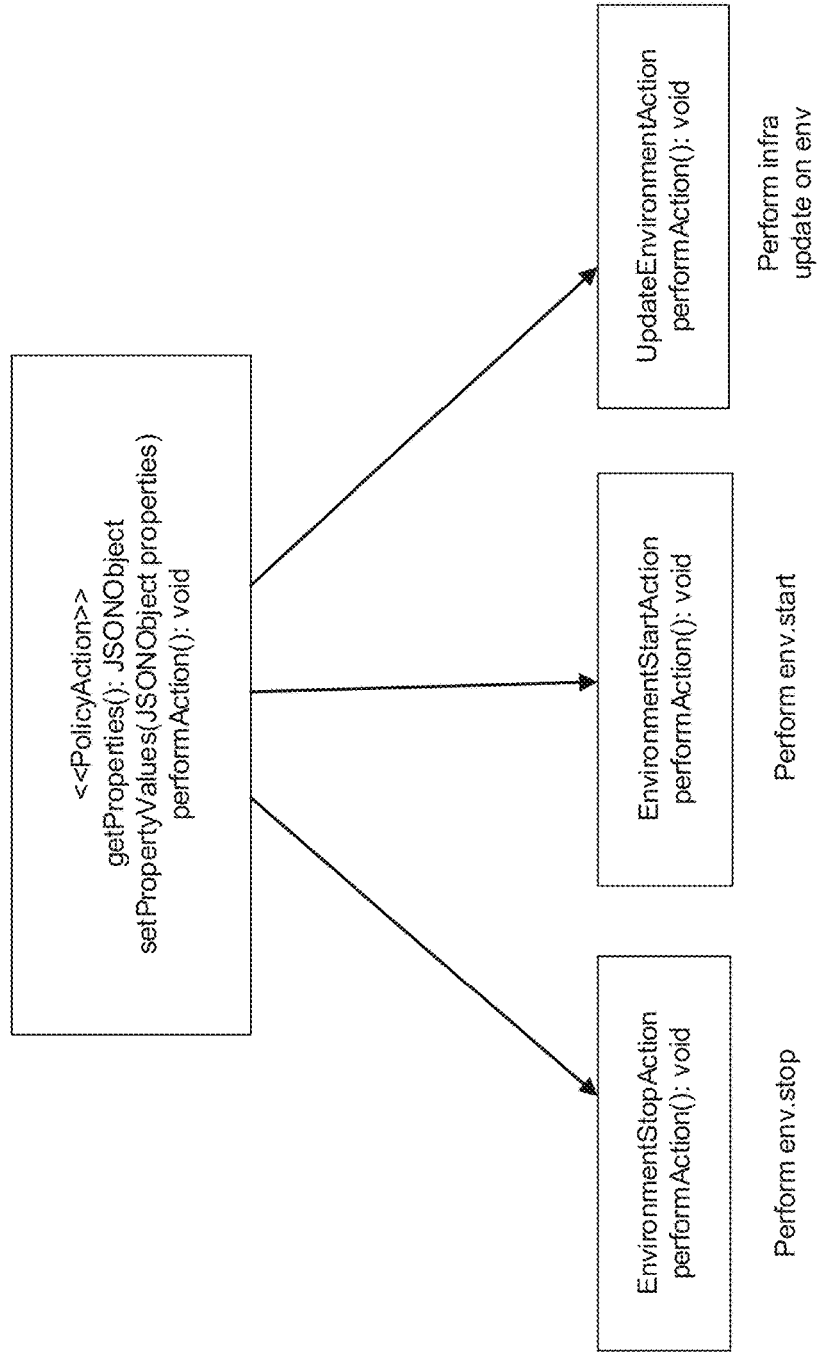
FIG. 11 illustrates a policy action object according to an example embodiment.

FIG. 11 illustrates a policy action object according to an example embodiment. For example, class diagram 1100 illustrates a policy action object. In some embodiments, each policy action class can implement logic to perform the policy action it represents. The class can expose methods to get/set properties for performing the action.

In some embodiments, a policy object class can implement the method 'executeMethod(methodName, JSONObject). For example, this method can be invoked by the policy engine, when the policy engine executes the corresponding policy action. In some embodiments, the properties for the policy action class can be passed as parameter to the 'executeMethod'. Example functionality for the environment stop action according to some embodiments is shown below.

```
public class EnvironmentPolicyObject implements PolicyObject
    {
    public void executeMethod(String methodName, JSONObject propObj)
{
    switch(methodName)
        {       case
            "Stop":
            stop(propObj);
            break;   case
            "Start":
            start(propObj);
            break;   default:
                break;
        }
    }
    ......
    protected void stop(JSONObject actionPropObj)
    {
        PolicyAction envStopAction = new EnvironmentStopAction( );
        envStopAction.setPropertyValues(actionPropObj);
        envStopAction.performAction( );
    }
}
```

Figure 12A:
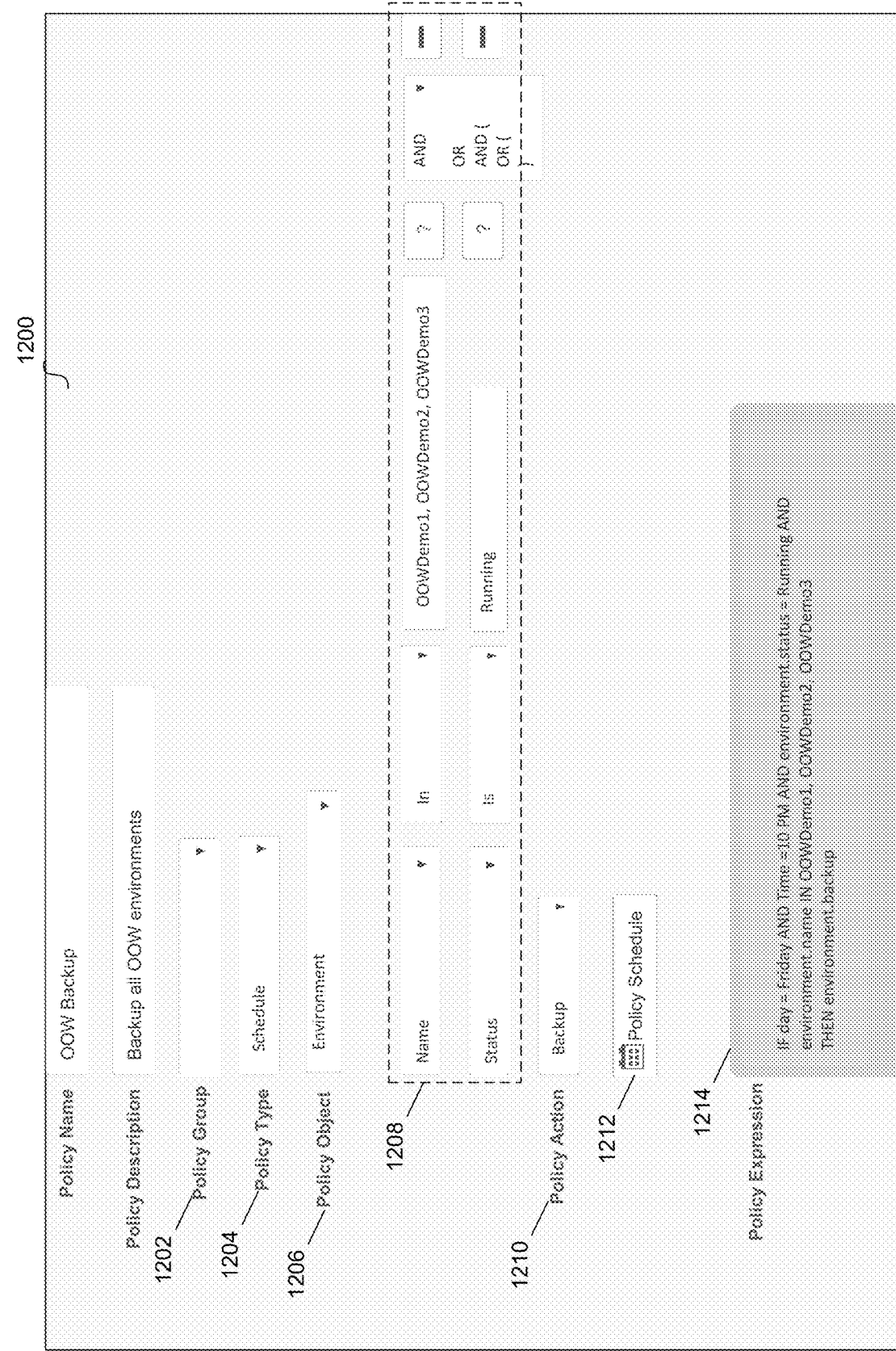
FIGS. 12A-12C illustrate user interfaces for governing cloud environments according to an example embodiment.
Figure 12B:
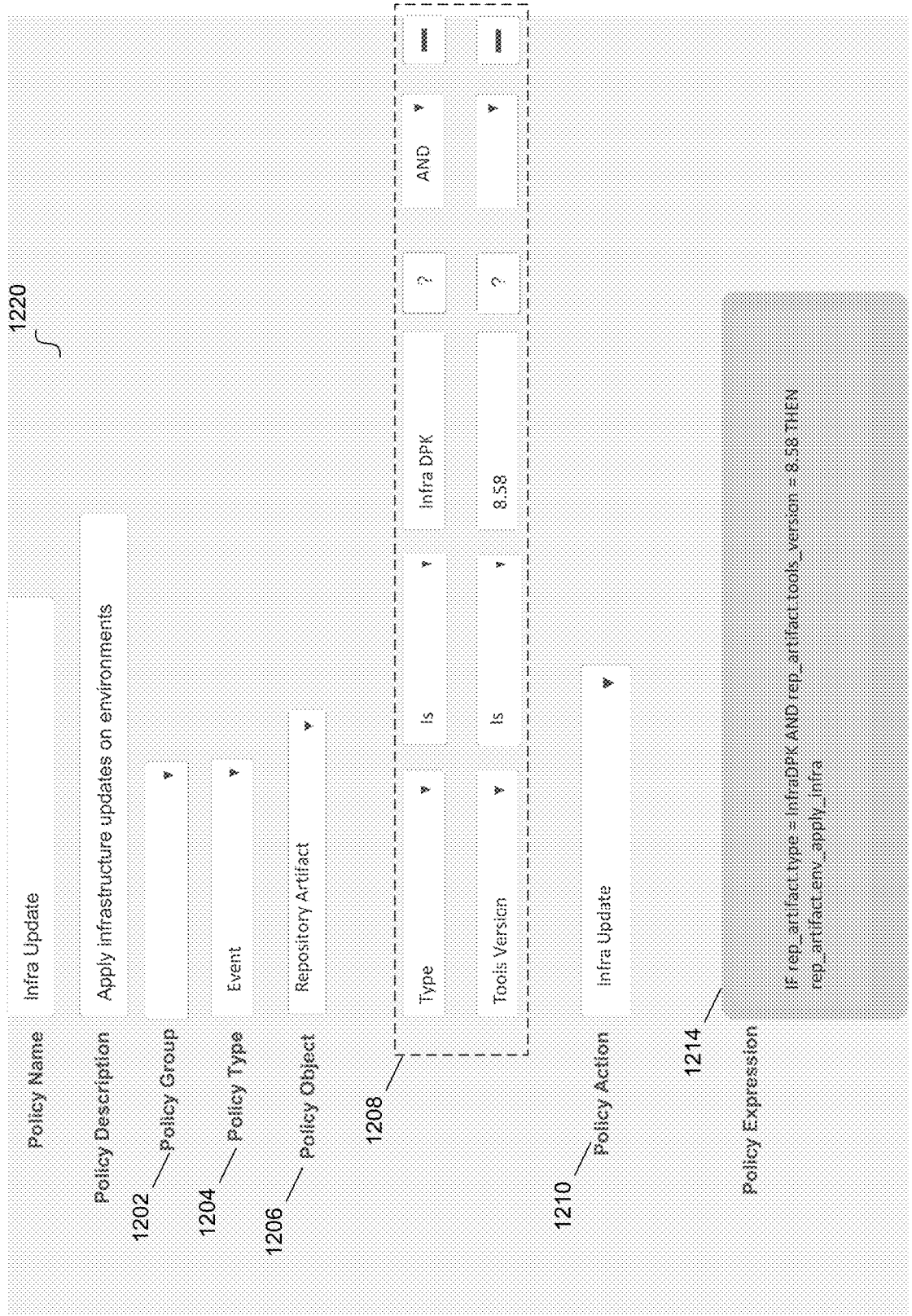
Figure 12C:
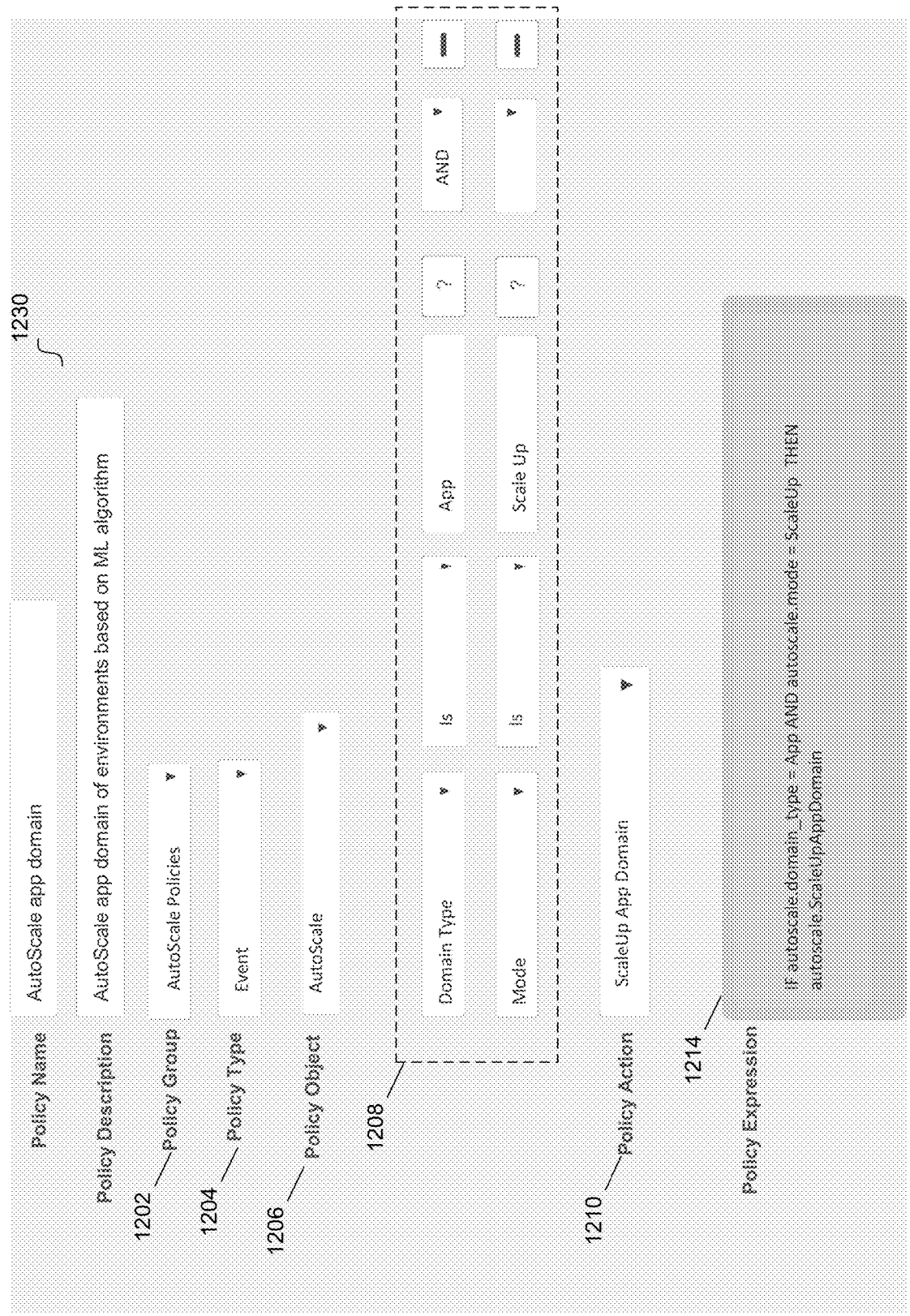

FIGS. 12A-12C illustrate user interfaces for governing cloud environments according to an example embodiment. Interface 1200 of FIG. 12A can be used by administrator or users to define conditions and actions for a policy (e.g., a selected policy object). Interface 1200 includes policy group 1202, policy type 1204, policy object 1206, conditions fields 1208, policy action 1210, policy schedule 1212, and policy expression 1212.

In some embodiments, the policy group can be the group the policy belongs to (e.g., selected using a dropdown). The policy type can describe the type of policy (e.g., schedule, event, and the like). The policy object can be the object type for the policy (e.g., environment, repository artifact, a custom object created by a user, and the like). Based on the underlying object structure for the selected policy object, conditions field 1208 dynamically displays forms to input conditions (e.g., properties of the object type) that are relevant to the selected policy object (e.g., environment). For example, properties for the environment policy object can include name and status, and thus input forms for name and status can be dynamically displayed in conditions field 1208 (e.g., when the environment policy object is selected).

Similarly, policy schedule 1212 can be dynamically displayed based on the policy type, which is schedule in interface 1200. Policy schedule can be used to select a schedule for the policy. Policy expression 1214 dynamically displays the expression for the policy defined using the input forms of interface 1200.

Policy action 1210 can be used to define the action for the policy. Based on the policy object definitions, the drop down menu can be populated with the possible policy actions for the policy object. In interface 1200, the selected policy action is backup (e.g., for the policy object environment). Policy actions can be based on the structure of the relevant policy object (e.g., Environment, Repository Artifact, Custom object, and the like). In some embodiments, the same set of policy actions can be triggered either through schedule policies or through event policies. In some embodiments, a similar set of policy actions can be triggered through schedule policies or through event policies, though these sets of policy actions may have some differences.

Interface 1220 of FIG. 12B similarly includes policy group 1202, policy type 1204, policy object 1206, conditions fields 1208, policy action 1210, and policy expression 1214. The policy type and object selected in interface 1220 are Event and Repository Artifact. Accordingly, conditions fields 1208 dynamically displays properties for the Repository Artifact policy object (e.g., Type, Tool Version, and any other suitable properties) as input forms to define conditions for the policy being defined.

Similarly, policy action 1210 can have the drop down menu populated with the possible policy actions for the Repository Artifact policy object. Policy schedule 1212 of interface 1200 is not displayed in interface 1220 because the selected policy type in interface 1220 is "Event", which does not take a schedule in its definition. Policy expression 1214 dynamically displays the expression for the policy defined using the input forms of interface 1220.

Interface 1230 of FIG. 12C similarly includes policy group 1202, policy type 1204, policy object 1206, conditions fields 1208, policy action 1210, and policy expression 1214. The policy type and object selected in interface 1230 are Event and Autoscale. Conditions fields 1208 dynamically displays properties for the Autoscale policy object (e.g., Domain Type, Mode, and any other suitable properties) as input forms to define conditions for the policy being defined.

Similarly, policy action 1210 can have the drop down menu populated with the possible policy actions for the Auto scale policy object/Event policy type (e.g., ScaleUpAppDomain). Policy schedule 1212 of interface 1200 is not displayed in interface 1230 because the selected policy type in interface 1230 is "Event", which does not take a schedule in its definition. Policy expression 1214 dynamically displays the expression for the policy defined using the input forms of interface 1230.

In some embodiments, because a user can define custom policy objects (e.g., by using the disclosed interface and exposing the relevant properties/methods) the user interface for governing cloud environments is extensible. In other words, once a custom policy object (with defined parameters/conditions and methods/actions) is created by a user, interfaces 1200, 1220, and/or 1230 can be configured such that policies can be defined and implemented using the custom policy object. This can include dynamically displaying/populating the relevant web forms (e.g., drop down menus, input forms) given the custom policy object structure.

Figure 13:
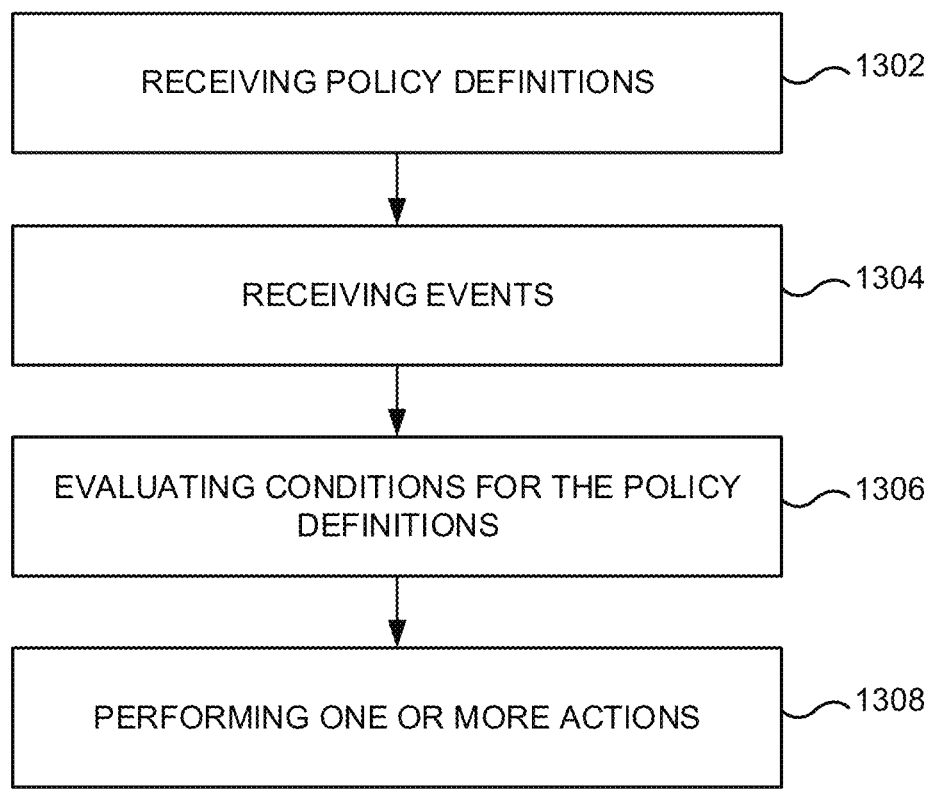
FIG. 13 illustrates a flowchart for governing cloud environments using a policy engine according to an example embodiment.

FIG. 13 illustrates a flowchart for governing cloud environments using a policy engine according to an example embodiment. In one embodiment, the functionality of FIG. 13 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 1302, a plurality of policy definitions for governing a plurality of managed environments are received at a policy engine, each policy definition including one or more conditions and one or more actions. In some embodiments, the managed environments implement cloud based virtual machines that host cloud based applications.

In some embodiments, each defined policy belongs to one of a predetermined set of policy objects. For example, the received policy definitions are defined by a user through a user interface, and when a policy object is selected using a first input form of the user interface, additional input forms are dynamically displayed on the user interface or dynamically populated based on a structure of the selected policy object. In some embodiments, each policy object structure includes policy object properties that are used to define conditions for a policy that belongs to the policy object.

At 1304, events that relate to one or more of the managed environments can be received at the policy engine. In some embodiments, the policy engine can subscribe to an application server for event push notifications.

At 1306, conditions for the policy definitions can be evaluated by the policy engine, where conditions for a first policy definition are triggered based on one or more of the received events. In some embodiments, the one or more received events that triggered the conditions for the first policy are events external to the first managed environment. For example, the events can be received from an AI/ML engine.

In some embodiments, evaluating conditions for the policy definitions includes evaluating policy expressions that represent the conditions of the policy definitions. For example, a policy grammar can be predefined such that the received policy definitions comply with the policy grammar, and runtime objects can be generated based on the predefined policy grammar. In some embodiments, the runtime objects can be used to evaluate the policy expressions by generating a parse tree for the policy expressions.

At 1308, based on the evaluating, one or more actions of the first policy definition can be performed, the one or more actions changing a first managed environment that is governed by the first policy definition. In some embodiments, the one or more actions of the first policy definition include one or more of starting the first managed environment, stopping the first managed environment, updating the first managed environment, backing up the first managed environment, scaling up cloud resources for the first managed environment, and scaling down cloud resources for the first managed environment Embodiments govern managed computing environments using a policy engine. An environment can include computing environment (e.g., cloud computing environment) with a set of resources for administration (e.g., cloud applications, cloud computing resources, virtual machines, and the like). A policy can be a simplified technique for administering and automating different use cases (e.g., environments and other factors) using rules. For example, an environment can be managed using a policy by defining certain rules that, when satisfied, trigger certain actions.

Embodiments of software, such as PeopleSoft, permit cloud administrators to manage different environments. For example, a common use case where policies can play a role is administering life cycle activities of environments. In some embodiments, policies can be scheduled or can be executed in real-time based on events. For example, scheduling allows policies to be executed at a set date and time or in a recurring fashion, such as: "Perform backup of all environments every Friday at 10 PM". In some embodiments, policies can also be triggered through internal or external events. An example policy that can make use of internal events is: "Perform update on all running environments, when a new Infra DPK is downloaded". In some embodiments, policies can also be connected with external events, such as "Oracle Cloud Infrastructure" events or events generated from artificial intelligence ("AI")/machine learning ("ML") engines.

In some embodiments, a policy engine can be configured to govern a plurality of computing environments. For example, various policies can be defined that each include conditions (e.g., for triggering the policy) and at least one action. In some embodiments, the policy engine can evaluate the conditions for the defined policies over time. For example, the conditions can be evaluated until one or more policies are triggered (e.g., when the conditions for the policies are met). In some embodiments, an external event can trigger a policy at the policy engine. Once triggered, the policy engine can execute one or more actions to manage an environment based on the triggered policy or policies.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for governing cloud environments using a policy engine, the method comprising:
   receiving, at a policy engine, a plurality of policy expressions for governing a plurality of managed environments, each policy expression comprising one or more conditions and one or more actions, wherein
      the managed environments implement cloud based virtual machines that host cloud based applications, and
      the policy expressions are processed to generate policy expression data structures for evaluating the policy expressions;
   receiving, at the policy engine, one or more events that relate to one or more of the managed environments, wherein events payloads are received corresponding to the one or more events;
   retrieving, by the policy engine, one or more policy objects associated with the one or more events, wherein retrieving at least a portion of the one or more policy objects comprises creating instances of the portion of policy objects based on event payloads from at least a portion of the one or more received events;
   evaluating, by the policy engine, the conditions for the policy expressions using the policy expression data structures and the retrieved policy objects, wherein,
      conditions for a first policy expression are triggered based on one or more of the received events, and
      the conditions for the first policy expression are evaluated using one or more of the portion of retrieved policy objects; and
   performing, based on the evaluating, one or more actions of the first policy expression, the one or more actions changing a first managed environment that is governed by the first policy expression, wherein the one or more actions of the first policy expression are performed via invoking at least one of the retrieved policy objects.

2. The method of claim 1, wherein the one or more received events comprise predefined event structures, and the one or more policy objects retrieved are associated with the one or more received events based on the predefined event structures.

3. The method of claim 1, wherein at least one policy object comprises an operating status information about one or more of the managed environments.

4. The method of claim 3, wherein the policy engine compares one or more conditions from the policy expression data structure that corresponds to the first policy expression to the operating status information from the one or more policy objects to determine that the conditions for the first policy expression are triggered by the one or more of the received events.

5. The method of claim 1, wherein the policy expressions are structured according to a predefined grammar.

6. The method of claim 5, wherein one or more runtime objects, generated according to a structure of the predefined grammar, are used to process the policy expressions and generate the policy expression data structures.

7. The method of claim 1, wherein the one or more actions of the first policy expression comprise one or more of starting the first managed environment, stopping the first managed environment, updating the first managed environment, backing up the first managed environment, scaling up cloud resources for the first managed environment, and scaling down cloud resources for the first managed environment.

8. The method of claim 1, wherein the policy expression data structures comprise parse trees generated based on the policy expressions.

9. The method of claim 3, wherein the operating status information about one or more of the managed environments is accessed by retrieving one or more properties of the at least one policy object.

10. The method of claim 9, wherein the one or more properties of the at least one policy object are retrieved via invoking a method of the at least one policy object.

11. The method of claim 1, wherein invoking at least one of the retrieved policy objects to perform the one or more actions comprises invoking a method of the at least one retrieved policy objects.

12. A system for governing cloud environments using a policy engine, the system comprising:
   a processor; and
   a memory storing instructions for execution by the processor, the instructions configuring the processor to:
   receive, at a policy engine, a plurality of policy expressions for governing a plurality of managed environments, each policy expression comprising one or more conditions and one or more actions, wherein
      the managed environments implement cloud based virtual machines that host cloud based applications, and
      the policy expressions are processed to generate policy expression data structures for evaluating the policy expressions;
   receive, at the policy engine, one or more events that relate to one or more of the managed environments, wherein events payloads are received corresponding to the one or more events;
   retrieve, by the policy engine, one or more policy objects associated with the one or more events, wherein at least a portion of the one or more policy objects are retrieved by creating instances of the portion of policy objects based on event payloads from at least a portion of the one or more received events;
   evaluate, by the policy engine, the conditions for the policy expressions using the policy expression data structures and the retrieved policy objects, wherein
      conditions for a first policy expression are triggered based on one or more of the received events, and
      the conditions for the first policy expression are evaluated using one or more of the portion of retrieved policy objects; and
   perform, based on the evaluating, one or more actions of the first policy expression, the one or more actions changing a first managed environment that is governed by the first policy expression, wherein the one or more actions of the first policy expression are performed via invoking at least one of the retrieved policy objects.

13. The system of claim 12, wherein the one or more received events comprise predefined event structures, and the one or more policy objects retrieved are associated with the one or more received events based on the predefined event structures.

14. The system of claim 12, wherein at least one policy object comprises an operating status information about one or more of the managed environments.

15. The system of claim 14, wherein the policy engine compares one or more conditions from the policy expression data structure that corresponds to the first policy expression to the operating status information from the one or more policy objects to determine that the conditions for the first policy expression are triggered by the one or more of the received events.

16. The system of claim 12, wherein the policy expressions are structured according to a predefined grammar.

17. The system of claim 16, wherein one or more runtime objects, generated according to a structure of the predefined grammar, are used to process the policy expressions and generate the policy expression data structures.

18. The system of claim 12, wherein the one or more actions of the first policy expression comprise one or more of starting the first managed environment, stopping the first managed environment, updating the first managed environment, backing up the first managed environment, scaling up cloud resources for the first managed environment, and scaling down cloud resources for the first managed environment.

19. The system of claim 12, wherein the policy expression data structures comprise parse trees generated based on the policy expressions.

20. A non-transitory computer readable medium having instructions stored thereon that, when executed by a processor, cause the processor to govern cloud environments using a policy engine, wherein, when executed, the instructions cause the processor to:

receive, at a policy engine, a plurality of policy expressions for governing a plurality of managed environments, each policy expression comprising one or more conditions and one or more actions, wherein the managed environments implement cloud based virtual machines that host cloud based applications, and the policy expressions are processed to generate policy expression data structures for evaluating the policy expressions;

receive, at the policy engine, one or more events that relate to one or more of the managed environments, wherein events payloads are received corresponding to the one or more events;

retrieve, by the policy engine, one or more policy objects associated with the one or more events, wherein at least a portion of the one or more policy objects are retrieved by creating instances of the portion of policy objects based on event payloads from at least a portion of the one or more received events;

evaluate, by the policy engine, the conditions for the policy expressions using the policy expression data structures and the retrieved policy objects, wherein conditions for a first policy expression are triggered based on one or more of the received events, and the conditions for the first policy expression are evaluated using one or more of the portion of retrieved policy objects; and perform, based on the evaluating, one or more actions of the first policy expression, the one or more actions changing a first managed environment that is governed by the first policy expression, wherein the one or more actions of the first policy expression are performed via invoking at least one of the retrieved policy objects.

* * * * *